US010819674B2

(12) United States Patent
Brown

(10) Patent No.: US 10,819,674 B2
(45) Date of Patent: Oct. 27, 2020

(54) METHODS, APPARATUSES, AND COMPUTER PROGRAMS FOR DATA PROCESSING, AND HIERARCHICAL DOMAIN NAME SYSTEM ZONE FILES

(71) Applicant: NUM Technology Ltd, London (GB)

(72) Inventor: Elliott Michael Brown, London (GB)

(73) Assignee: NUM TECHNOLOGY LTD., London (GB)

( * ) Notice: Subject to any disclaimer, the term of this patent is extended or adjusted under 35 U.S.C. 154(b) by 77 days.

(21) Appl. No.: 16/016,183

(22) Filed: Jun. 22, 2018

(65) Prior Publication Data
US 2018/0309713 A1    Oct. 25, 2018

Related U.S. Application Data

(63) Continuation of application No. PCT/GB2016/054051, filed on Dec. 22, 2016.

(30) Foreign Application Priority Data

Dec. 24, 2015  (GB) .................................. 1522923.0

(51) Int. Cl.
*G06F 15/16*    (2006.01)
*H04L 29/12*    (2006.01)
(Continued)

(52) U.S. Cl.
CPC ........ *H04L 61/1511* (2013.01); *G06F 16/951* (2019.01); *H04L 61/305* (2013.01);
(Continued)

(58) Field of Classification Search
CPC . H04L 61/1511; H04L 61/305; H04L 61/302; H04L 61/6004; H04L 67/02; G06F 16/951; G06Q 30/00
See application file for complete search history.

(56) References Cited

U.S. PATENT DOCUMENTS 6,131,095 A     10/2000 Low et al.
2002/0161745 A1 10/2002 Call
(Continued)

FOREIGN PATENT DOCUMENTS

EP    1993267 A1    11/2008
EP    2006781 A1    12/2008
(Continued)

OTHER PUBLICATIONS

Anonymous—"WHOIS—Wikipedia" Retrieved from the Internet: URL: https://en.wikipedia.org/w/index.php?title=WHOIS&oldid=689698417.
(Continued)

*Primary Examiner* — Richard G Keehn
(74) *Attorney, Agent, or Firm* — EIP US LLP

(57) ABSTRACT

Data is processed in a data communications network comprising a hierarchical domain name system. An authoritative name server for a first domain name processes a received domain name query for the first domain name by obtaining one or more resource records associated with the first domain name. The one or more resource records comprise contact information associated with an entity associated with a second domain name. The authoritative name server transmits a response to the domain name query. The response comprises the one or more resource records. The first domain name includes the second domain name and at least one label following the second domain name.

18 Claims, 24 Drawing Sheets

(51) Int. Cl.
*G06F 16/951* (2019.01)
*H04L 29/08* (2006.01)
*G06Q 30/00* (2012.01)

(52) U.S. Cl.
CPC .......... *H04L 61/6004* (2013.01); *H04L 67/02* (2013.01); *G06Q 30/00* (2013.01); *H04L 61/302* (2013.01)

(56) References Cited

U.S. PATENT DOCUMENTS

| | | | |
|---|---|---|---|
| 2003/0007482 A1 | 1/2003 | Khello et al. | |
| 2010/0005191 A1* | 1/2010 | Drako | H04L 61/1511 709/238 |
| 2010/0023611 A1 | 1/2010 | Yang et al. | |
| 2011/0153864 A1 | 6/2011 | Prasad et al. | |
| 2012/0272172 A1 | 10/2012 | Nicks et al. | |
| 2013/0045721 A1 | 2/2013 | Comolatti | |
| 2014/0163994 A1 | 6/2014 | Lau et al. | |

FOREIGN PATENT DOCUMENTS

| | | |
|---|---|---|
| GB | 2479565 A | 10/2011 |
| WO | 0237308 A1 | 5/2002 |
| WO | 2014147480 A1 | 9/2014 |

OTHER PUBLICATIONS

J. Lee, H. Schulzrinne, Columbia U: "SIP URI Service Discovery Using DNS-SD—draft-lee-sip-dns-sd-uri-00" https://tools.ietf.org/id/draft-lee-sip-dns-sd-uri-00.txt Aug. 28, 2007.

P. Mockapetris, ISI: "Domain Names—Implementation and Specification" https://www.ietf.org/rfc/rfc1035.txt Nov. 1987.

J. Levine, Taughannock Networks: "DNS Blacklist and Whitelists" RFC 5782 https://tools.ietf.org/html/rfc5782 Feb. 2010.

The Spamhaus Project.website https://www.spamhaus.org/ Feb. 15, 2016.

United Kingdom Combined Search Examination Report dated Feb. 19, 2016 on related GB Application No. GB1522923.0 filed Dec. 24, 2015.

United Kingdom Search Report dated Aug. 18, 2017 on related GB Application No. GB1522923.0 filed Dec. 24, 2015.

\* cited by examiner

METHODS, APPARATUSES, AND COMPUTER PROGRAMS FOR DATA PROCESSING, AND HIERARCHICAL DOMAIN NAME SYSTEM ZONE FILES

CROSS-REFERENCE TO RELATED APPLICATIONS

This application is a continuation under 35 U.S.C. § 120 of International Application No. PCT/GB2016/054051, filed Dec. 22, 2016, which claims priority to United Kingdom Application No. 1522923.0, filed Dec. 24, 2015 under 35 U.S.C. § 119(a). Each of the above-referenced patent applications is incorporated by reference in its entirety.

BACKGROUND OF THE INVENTION

Field of the Invention

The present invention relates to methods, apparatuses, and computer programs for data processing, and hierarchical domain name system zone files.

Description of the Related Technology

There are many ways in which a person can find contact details for an entity whose contact details they do not already have.

In some known scenarios, a person seeking the contact details of a business having a website at http://www.example.com might visit that website using a web browser and then browse the website for such contact details. For example, the person may look for phone number to dial, a postcode to visit a store, a social media profile to connect via social media, or various other ways to establish contact with the business.

In other known scenarios, a person seeking the contact details of a business may use a search engine to try to identify the contact details of the business. For example, the user may visit the search engine in a web browser and search for such contact details. For example, they may enter the name of the business followed by the particular type of contact details required, e.g. "example business name phone number".

While these known techniques may allow the person to identify contact details, they can consume considerable amounts of data, require significant user interaction and/or introduce an undesirable delay for the contact details to be retrieved.

SUMMARY

According to a first aspect of the present invention, there is provided a method of processing data in a data communications network comprising a hierarchical domain name system, the method comprising, at an authoritative name server for a first domain name: receiving, via the data communications network, a domain name system query for the first domain name; processing the received domain name system query for the first domain name, said processing comprising obtaining one or more resource records associated with the first domain name, the one or more resource records comprising contact information associated with an entity associated with a second, different domain name; and transmitting, via the data communications network, a response to the domain name system query for the first domain name, the response comprising the one or more resource records comprising the contact information associated with the entity associated with the second, different domain name, wherein the first domain name includes the second domain name, and wherein the first domain name includes at least one label following the second domain name.

According to a second aspect of the present invention, there is provided a method of processing data in a data communications network comprising a hierarchical domain name system, the method comprising: transmitting, via the data communications network, a domain name system query for a first domain name; receiving, via the data communications network, a response to the domain name system query for the first domain name, the response comprising one or more resource records comprising contact information associated with an entity associated with a second, different domain name; and processing the response to the domain name system query for the first domain name, said processing comprising identifying the contact information associated with the entity associated with the second domain name in the one or more resource records, wherein the first domain name includes the second domain name, and wherein the first domain name includes at least one label following the second domain name.

According to a third aspect of the invention, there is provided apparatus arranged to perform a method of processing data in a data communications network comprising a hierarchical domain name system, the method comprising, at an authoritative name server for a first domain name: receiving, via the data communications network, a domain name system query for the first domain name; processing the received domain name system query for the first domain name, said processing comprising obtaining one or more resource records associated with the first domain name, the one or more resource records comprising contact information associated with an entity associated with a second, different domain name; and transmitting, via the data communications network, a response to the domain name system query for the first domain name, the response comprising the one or more resource records comprising the contact information associated with the entity associated with the second domain name, wherein the first domain name includes the second domain name, and wherein the first domain name includes at least one label following the second domain name.

According to a fourth aspect of the invention, there is provided apparatus arranged to perform a method of processing data in a data communications network comprising a hierarchical domain name system, the method comprising: transmitting, via the data communications network, a domain name system query for a first domain name; receiving, via the data communications network, a response to the domain name system query for the first domain name, the response comprising one or more resource records comprising contact information associated with an entity associated with a second, different domain name; and processing the response to the domain name system query for the first domain name, said processing comprising identifying the contact information associated with the entity associated with the second domain name in the one or more resource records, wherein the first domain name includes the second domain name, and wherein the first domain name includes at least one label following the second domain name.

According to a fifth aspect of the invention, there is provided a computer program arranged, when executed, to perform a method of processing data in a data communications network comprising a hierarchical domain name system, the method comprising, at an authoritative name server for a first domain name: receiving, via the data communications network, a domain name system query for the first domain name; processing the received domain name system query for the first domain name, said processing comprising obtaining one or more resource records associated with the first domain name, the one or more resource records comprising contact information associated with an entity associated with a second, different domain name; and transmitting, via the data communications network, a response to the domain name system query for the first domain name, the response comprising the one or more resource records comprising the contact information associated with the entity associated with the second domain name, wherein the first domain name includes the second domain name, and wherein the first domain name includes at least one label following the second domain name.

According to a sixth aspect of the invention, there is provided a computer program arranged, when executed, to perform a method of processing data in a data communications network comprising a hierarchical domain name system, the method comprising: transmitting, via the data communications network, a domain name system query for a first domain name; receiving, via the data communications network, a response to the domain name system query for the first domain name, the response comprising one or more resource records comprising contact information associated with an entity associated with a second, different domain name; and processing the response to the domain name system query for the first domain name, said processing comprising identifying the contact information associated with the entity associated with the second domain name in the one or more resource records, wherein the first domain name includes the second domain name, and wherein the first domain name includes at least one label following the second domain name.

According to a seventh aspect of the invention, there is provided a hierarchical domain name system zone file, comprising: data identifying a first domain name; and contact information associated with an entity associated with a second, different domain name, wherein the first domain name includes the second domain name, and wherein the first domain name includes at least one label following the second domain name.

According to an eighth aspect of the invention, there is provided a method of processing data in a data communications network comprising a hierarchical domain name system, the method comprising, at an authoritative name server for a first domain name: receiving, via the data communications network, a domain name system query for the first domain name; processing the received domain name system query for the first domain name, said processing comprising obtaining one or more resource records associated with the first domain name, the one or more resource records comprising contact information associated with an entity associated with a second, different domain name; and transmitting, via the data communications network, a response to the domain name system query for the first domain name, the response comprising the one or more resource records comprising the contact information associated with the entity associated with the second domain name, wherein the first domain name includes the second domain name, wherein the first domain name includes at least one label preceding the second domain name, and wherein the contact information is in plaintext form in the one or more resource records and/or one or more resource records are of a TXT type.

According to an ninth aspect of the invention, there is provided a method of processing data in a data communications network comprising a hierarchical domain name system, the method comprising: transmitting, via the data communications network, a domain name system query for a first domain name; receiving, via the data communications network, a response to the domain name system query for the first domain name, the response comprising one or more resource records comprising contact information associated with an entity associated with a second, different domain name; and processing the response to the domain name system query for the first domain name, said processing comprising identifying the contact information associated with the entity associated with the second domain name in the one or more resource records, wherein the first domain name includes the second domain name, wherein the first domain name includes at least one label preceding the second domain name, and wherein the contact information is in plaintext form in the one or more resource records and/or one or more resource records are of a TXT type.

According to a tenth aspect of the invention, there is provided apparatus configured to perform a method of processing data in a data communications network comprising a hierarchical domain name system, the method comprising, at an authoritative name server for a first domain name: receiving, via the data communications network, a domain name system query for the first domain name; processing the received domain name system query for the first domain name, said processing comprising obtaining one or more resource records associated with the first domain name, the one or more resource records comprising contact information associated with an entity associated with a second, different domain name; and transmitting, via the data communications network, a response to the domain name system query for the first domain name, the response comprising the one or more resource records comprising the contact information associated with the entity associated with the second domain name, wherein the first domain name includes the second domain name, wherein the first domain name includes at least one label preceding the second domain name, and wherein the contact information is in plaintext form in the one or more resource records and/or one or more resource records are of a TXT type.

According to an eleventh aspect of the invention, there is provided apparatus configured to perform a method of processing data in a data communications network comprising a hierarchical domain name system, the method comprising: transmitting, via the data communications network, a domain name system query for a first domain name; receiving, via the data communications network, a response to the domain name system query for the first domain name, the response comprising one or more resource records comprising contact information associated with an entity associated with a second, different domain name; and processing the response to the domain name system query for the first domain name, said processing comprising identifying the contact information associated with the entity associated with the second domain name in the one or more resource records, wherein the first domain name includes the second domain name, wherein the first domain name includes at least one label preceding the second domain name, and wherein the contact information is in plaintext form in the one or more resource records and/or one or more resource records are of a TXT type.

According to a twelfth aspect of the invention, there is provided a computer program arranged, when executed, to perform a method of processing data in a data communications network comprising a hierarchical domain name system, the method comprising, at an authoritative name server for a first domain name: receiving, via the data communications network, a domain name system query for the first domain name; processing the received domain name system query for the first domain name, said processing comprising obtaining one or more resource records associated with the first domain name, the one or more resource records comprising contact information associated with an entity associated with a second, different domain name; and transmitting, via the data communications network, a response to the domain name system query for the first domain name, the response comprising the one or more resource records comprising the contact information associated with the entity associated with the second domain name, wherein the first domain name includes the second domain name, wherein the first domain name includes at least one label preceding the second domain name, and wherein the contact information is in plaintext form in the one or more resource records and/or one or more resource records are of a TXT type.

According to a thirteenth aspect of the invention, there is provided a computer program arranged, when executed, to perform a method of processing data in a data communications network comprising a hierarchical domain name system, the method comprising: transmitting, via the data communications network, a domain name system query for a first domain name; receiving, via the data communications network, a response to the domain name system query for the first domain name, the response comprising one or more resource records comprising contact information associated with an entity associated with a second, different domain name; and processing the response to the domain name system query for the first domain name, said processing comprising identifying the contact information associated with the entity associated with the second domain name in the one or more resource records, wherein the first domain name includes the second domain name, wherein the first domain name includes at least one label preceding the second domain name, and wherein the contact information is in plaintext form in the one or more resource records and/or one or more resource records are of a TXT type.

According to a fourteenth aspect of the invention, there is provided a hierarchical domain name system zone file comprising: data identifying a first domain name; and contact information associated with an entity associated with a second, different domain name, wherein the first domain name includes the second domain name, wherein the first domain name includes at least one label preceding the second domain name, and wherein the contact information is in plaintext form.

According to a fifteenth aspect of the invention, there is provided a hierarchical domain name system zone file comprising: data identifying a first domain name; and contact information associated with an entity associated with a second, different domain name, wherein the first domain name includes the second domain name, wherein the first domain name includes at least one label preceding the second domain name, and wherein the contact information is in a resource record of a TXT type.

According to a sixteenth aspect of the invention, there is provided a method of processing data in a data communications network comprising a hierarchical domain name system, the method comprising: transmitting, via the data communications network, a request for website content from a website associated with a domain name; receiving the website content via the data communications network; parsing the received website content for contact information associated with an entity associated with the domain name using at least one automated contact information parsing technique; and causing the contact information to be stored in a zone file.

According to a seventeenth aspect of the invention, there is provided apparatus configured to provide a method of processing data in a data communications network comprising a hierarchical domain name system, the method comprising: transmitting, via the data communications network, a request for website content from a website associated with a domain name; receiving the website content via the data communications network; parsing the received website content for contact information associated with an entity associated with the domain name using at least one automated contact information parsing technique; and causing the contact information to be stored in a zone file.

According to an eighteenth aspect of the invention, there is provided a computer program arranged, when executed, to perform a method of processing data in a data communications network comprising a hierarchical domain name system, the method comprising: transmitting, via the data communications network, a request for website content from a website associated with a domain name; receiving the website content via the data communications network; parsing the received website content for contact information associated with an entity associated with the domain name using at least one automated contact information parsing technique; and causing the contact information to be stored in a zone file.

According to a nineteenth aspect of the invention, there is provided a hierarchical domain name system zone file comprising: contact information associated with an entity associated with a domain name, wherein the zone file comprises data indicative that the contact information has been obtained using an automated contact information parsing technique.

According to a twentieth aspect of the invention, there is provided a hierarchical domain name system zone file comprising: contact information associated with an entity associated with a domain name, wherein the contact information associated with an entity associated with a domain name is comprised in one or more resource records of a TXT type.

Further features will become apparent from the following description of embodiments, given by way of example only, which is made with reference to the accompanying drawings.

DETAILED DESCRIPTION OF CERTAIN INVENTIVE EMBODIMENTS

Figure 1:
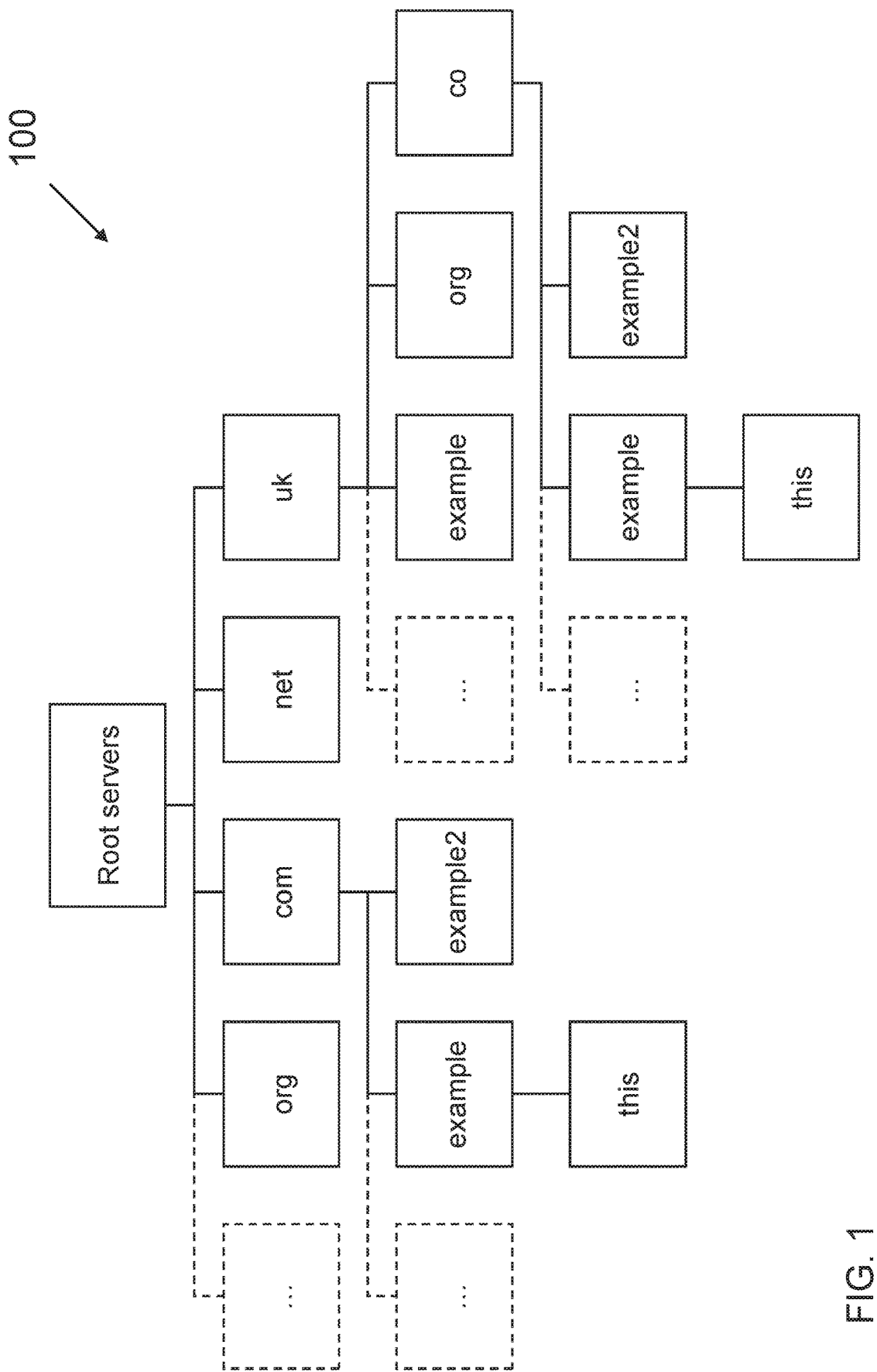
FIG. 1 shows a schematic block diagram of an example of a hierarchical domain name system.

Referring to FIG. 1, there is shown schematically an example of a hierarchical domain name system 100. In this example, the hierarchical domain name system is the Domain Name System (DNS).

The DNS is a global, distributed, hierarchical naming system for resources connected to computer networks. DNS is detailed, for example, in RFC 1034 and 1035. One function of the DNS is to translate human-friendly domain names into machine-friendly Internet Protocol (IP) addresses. For example, the DNS may translate a human-friendly domain name of "example.com" into a machine-friendly IP address of 123.45.67.89. The DNS serves as the directory service of the Internet.

Every domain name on the Internet is part of the DNS. The DNS is a cornerstone of the Internet and was created to make the Internet easier to use. The DNS translates easy-to-remember domain names into IP addresses of IP devices, such as servers. The DNS is used every day by billions of people. The DNS is used each time someone enters a domain name into their web browser. The DNS tells a web browser which web server to go to when a website, for example "example.com", is requested, for example on a computer or smartphone.

Every domain name is hosted on a DNS server. There are many thousands of DNS servers operating worldwide. Information about a domain name is stored in a zone file on a DNS server. A zone file contains DNS resource records. The DNS is made up of name servers that hold information about domain names in DNS zones. Information for each domain name is held in a zone file. Included within the zone file are DNS resource records.

At the highest level of the DNS hierarchy are the root name servers. The root name servers list the authoritative name servers for top-level-domains (TLDs). Examples of TLDs include, but are not limited to "com" and "uk".

In the domain name "this.example.com", the following are all domain names: "this.example.com", "example.com" and "com". "com" is a TLDs. In addition to being a domain name, "example.com" is a sub-domain of the TLD "com", and "this.example.com" is a sub-domain of the domain name "example.com". Each of the parts of a domain name separated by a dot is called a label. In the domain name "this.example.com", "this", "example" and "com" are labels.

In the domain name "this.example.co.uk", the following are all domain names: "this.example.co.uk", "example.co.uk", "co.uk" and "uk". "uk" is a country code TLD (ccTLD). In addition to being a domain name, "co.uk" is a sub-domain of the ccTLD "uk", "example.co.uk" is a sub-domain of the domain name "co.uk" and "this.example.co.uk" is a sub-domain of the domain name "example.co.uk". In the domain name "this.example.co.uk", "this", "example", "co" and "uk" are labels.

A TLD (or "name space") is managed by a Domain Registry (hereinafter "Registry"). For example, VeriSign is the Registry that manages the "com" name space. Nominet is the Registry that manages the "uk" name space. Some Registries have split their domain name into sub-domains. For example, Nominet has split their TLD "uk" into "co.uk", "org.uk", "me.uk" and others. Nominet has recently allowed the creation of domain names at the second level under "uk" in the format of "example.uk". Creating new domains within a name space is known as a domain name registration.

Although domain names can sometimes be registered directly through Registries, this is discouraged and registration of domain names within the Registry name space is typically through Domain Registrars (hereinafter "Registrars"). Registrars charge a fee for registrations within their name space. This fee varies per Registrar but may for example be charged on a yearly basis. A person registering a domain name (e.g. "example.com") through a Registrar is known as a Registrant. A registrant is allowed to set up further domain names (a sub-domain) within their domain (e.g. this.example.com). The registrant may be able to set up the sub-domains at no extra cost.

Every domain name has an authoritative name server. An authoritative name server is the name server that holds the current DNS resource records for the domain name. There are various types of DNS resource record. One type of resource record is Name Server (NS) record. An NS resource record is used to delegate authority for a DNS zone to another name server. The most common DNS resource record is an "A" record. An A record is used to direct website requests to IP addresses. There are other DNS resource record types including, but not limited to, Mail Exchange records (MX) for e-mail, records for free text (TXT) along with other record types.

Figure 2:
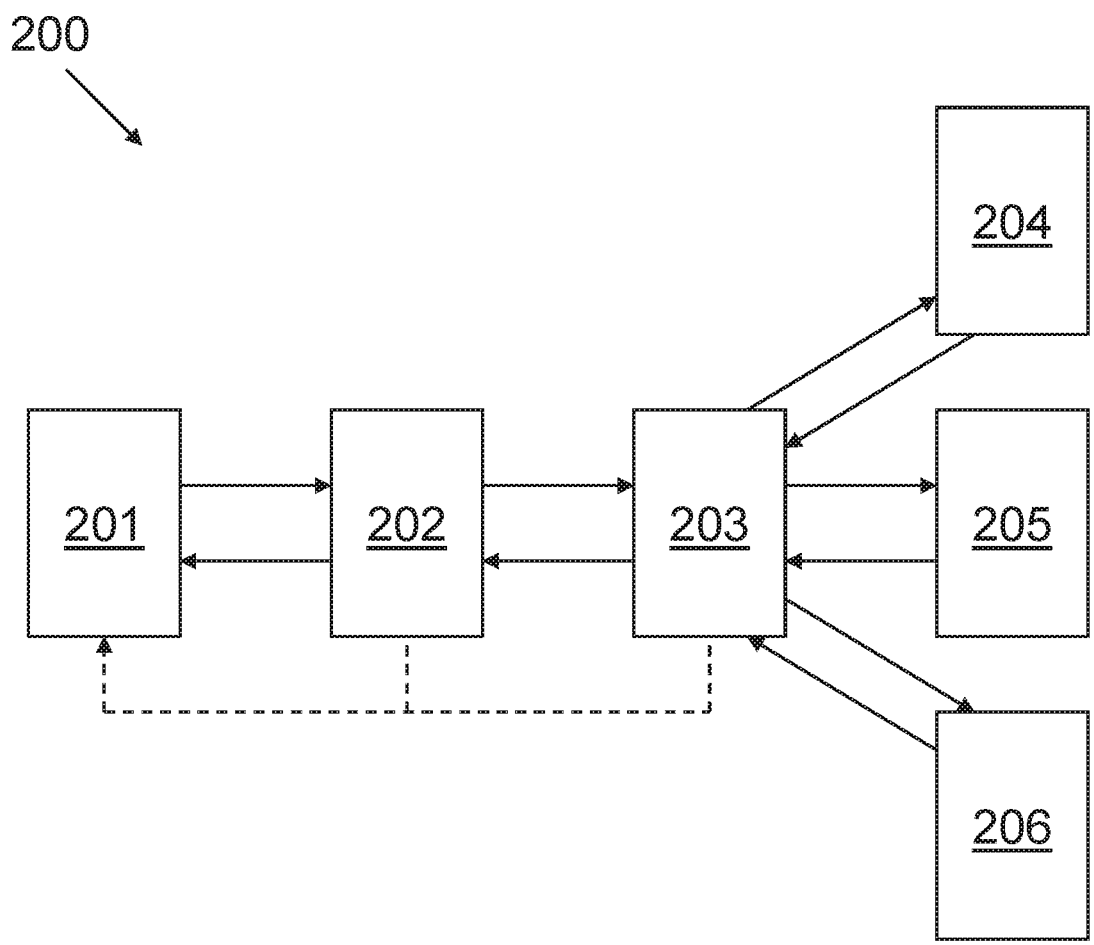
FIG. 2 shows a schematic block diagram of an example of a data processing network.

Referring to FIG. 2, there is shown schematically an illustration of an example of a data communications network 200.

The data communications network 200 includes a user device 201. The user device is associated with a user. Examples of user device 201 include, but are not limited to, a smartphone, tablet computing device, laptop computer, desktop computer, satellite navigation device and a smart television. The data communications network 200 also includes a local network 202. The local network 202 includes one or more components. An example of a component of the local network 202 is a router. The communications network 200 also includes a DNS resolver 203 at an Internet Service Provider (ISP) of the user. The communications network 200 also includes a root server 204. The communications network 200 also includes a registry name server 205. In this example, the registry name server 205 is an authoritative name server of the top-level domain name "com". The communications network 200 also includes a registrant name server 206. In this example, the registrant name server 206 is an authoritative name server of the domain name "example.com".

The process of finding DNS resource records for a domain name is known as DNS resolution or domain name resolution. DNS resolvers are used for this purpose. DNS resolvers determine the authoritative name servers for a given domain name by resolving the full domain name starting with the right-most label and working to the left-most label in the domain name.

In this example, a user enters the domain name "example.com" into a web browser on their user device 201.

If the domain name has been resolved recently, DNS resource records previously retrieved for the domain name will be stored in the user device 201 DNS cache or in the local network 202 DNS cache and will be returned to the user device 201.

If the domain name "example.com" has not been resolved recently, for example if an IP address for the domain name "example.com" is not cached in the local network 202, then the DNS query is passed to the DNS resolver 203.

In this example, the DNS resolver 203 performs recursive DNS lookups, starting with the label "com". The DNS resolver 203 resolves the domain name starting with the right-most label first and requests the IP address for the authoritative name server 205 for the "com" TLD from the root server 204. The IP address for the authoritative name server 205 for the "com" domain name is returned from the root server 204.

The DNS resolver 203 queries the authoritative name server 205 for the domain name "com" for the IP address of the authoritative name server 206 of the domain name "example.com".

The authoritative name server 205 for the domain name "com" returns the IP address of the authoritative name server 206 for the domain name "example.com" to the DNS resolver 203. In this example, the authoritative name server 206 for the domain name "example.com" is the name server elected by the Registrant of the domain name "example.com" when they registered their domain name "example.com".

As the DNS resolver 203 has reached the left-most label of the domain name "example.com", the DNS resolver 203 requests the DNS resource records for the domain name "example.com" from the authoritative server 206 for the domain name "example.com". The DNS resolver 203 returns an error if no resource records were found.

Assuming resource records were found for the domain name "example.com", an IP address of a web server associated with the domain name "example.com" is returned to the DNS resolver 203 in the resource records for the domain name "example.com". The DNS resolver 203 caches the resource records.

The DNS resolver 203 returns the resource records to the local network 202. The local network 202 caches the resource records.

The local network 202 returns the resource records to the user device 201. The user device 201 caches the resource records. The web browser running on the user device 201 sends a request to the IP address for the web server associated with the domain name "example.com" on port 80 for website HTML content for the domain name "example.com". The IP address for the web server associated with the domain name "example.com" was included in the resource records returned by the DNS resolver 203.

As indicated above, the resource records retrieved for the domain name "example.com" are cached on the user device 201, in the local network 202 and by the DNS resolver 203 for a specified time. The specified time is determined by a Time-to-live ("TTL") setting of the resource record that was returned.

A DNS query is sent to a name server using User Datagram Protocol (UDP) on port 53. A response to a DNS query from a name server includes an answer to the query. The answer comes from a DNS zone file, which lists the resource records for the domain name. Every domain name has an associated zone file; even TLDs.

The format of a DNS zone file is defined in RFC 1035 (section 5) and RFC 1034 (section 3.6.1). This format was originally used by the Berkeley Internet Name Domain (BIND) software package, but has been widely adopted by other DNS servers. A zone file is a sequence of entries of resource records. Each line in the zone file is a text description that defines a single resource record. The text description comprises several fields separated by white space as follows:

| NAME | TTL | CLASS | TYPE | DATA |
| --- | --- | --- | --- | --- |

An example entry in a zone file for the example domain name "example.com" is:

| NAME | TTL | CLASS | TYPE | DATA |
| --- | --- | --- | --- | --- |
| example.com. | 270 | IN | A | 123.45.67.89 |

The TTL value indicates how long the record should be cached for, which, in this example, is 270 seconds.

An example of a DNS query for any DNS resource record type for the example domain name "example.com" generated using the "dig" command line tool is:

example.com. IN ANY

An example of a response received from a name server for the domain name "example.com" is:

| | | | | |
| --- | --- | --- | --- | --- |
| example.com. | 270 | IN | A | 123.45.67.89 |
| example.com. | 194 | IN | MX | 10 mailserver.com |
| example.com. | 91816 | IN | NS | ns1.nameserver.com. |
| example.com. | 91816 | IN | NS | ns2.nameserver.com. |
| example.com. | 1840 | IN | TXT | "v=spf1 ip4 123.45.67.89 - all" |

In this example, the DNS query for the domain name "example.com" has returned five resource records. Each resource record is displayed on its own line. The first resource record, displayed on the first line, is an A record showing the IP address of the server that handles HTTP requests on port "80". The second resource record, displayed on the second line, is an MX resource record with a priority of "10" showing that e-mail is handled by "mailserver.com". The third and fourth resource records, shown on the third and fourth lines, are NS records which show that the authoritative name servers for the domain name are "ns1.nameserver.com" and "ns2.nameserver.com". The final resource record on the fifth line is a TXT record in a Sender Policy Framework ("SPF") format.

SPF is an established way to tackle spam. SPF allows domain name owners to list servers that are allowed to send e-mail on behalf of the domain name. The SPF record in the example above means that the only IP address allowed to send e-mail on behalf of the domain name "example.com" is the IP address 123.45.67.89. The final part "-all" means that e-mail from all other IP addresses should be treated as spam. Recipient e-mail servers check the SPF record when receiving e-mail from a domain name and follow the guidance in the SPF to help filter and block spam e-mail.

Figure 3:
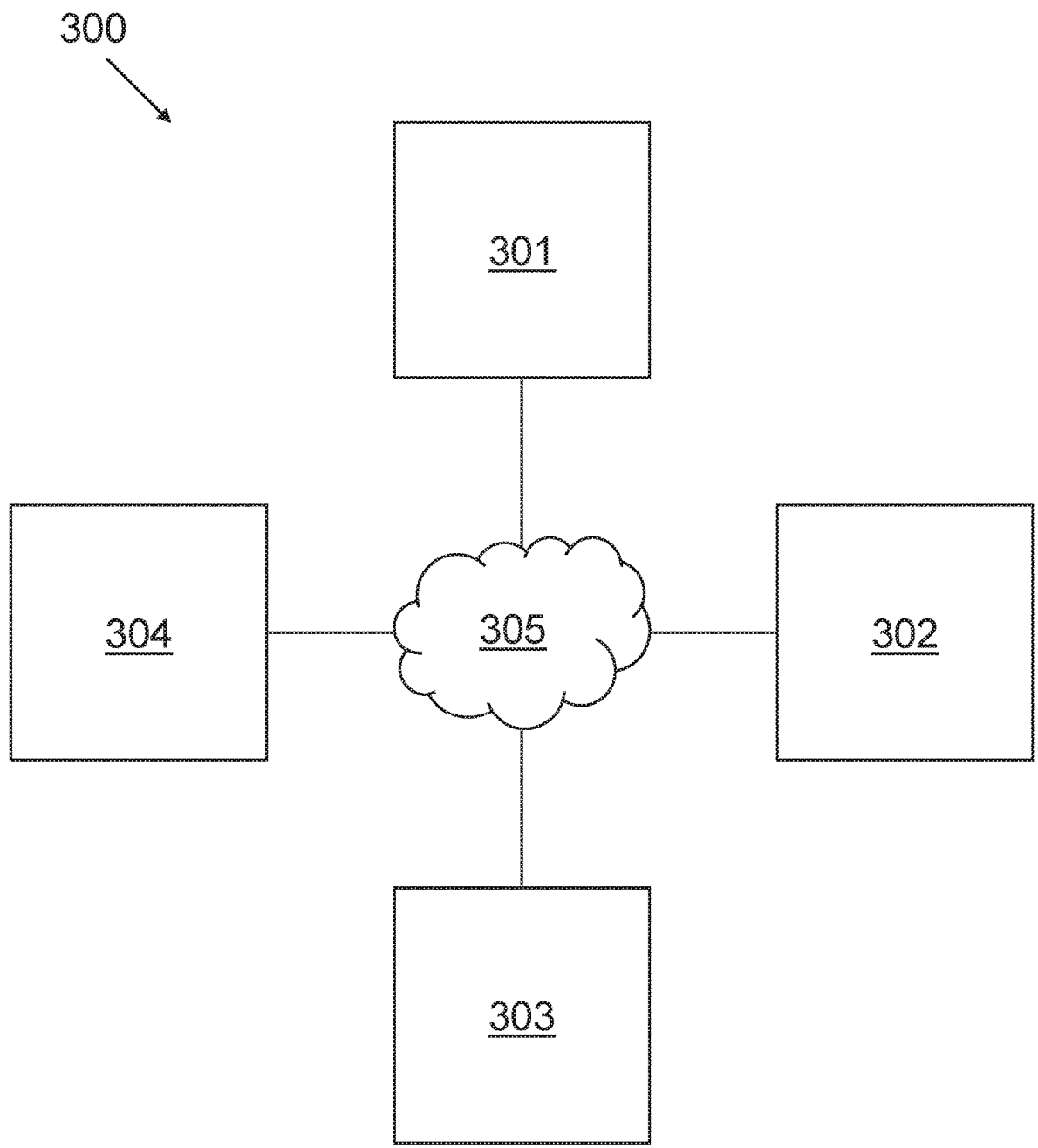
FIG. 3 shows a schematic block diagram of an example of a data processing network in accordance with an embodiment of the present invention.

Referring to FIG. 3, there is shown schematically a block diagram of an example of a data communications network 300. The data communications network 300 may be used to process data in the manner described in detail herein.

In this example, the data communications network 300 is used to apply a framework referred to hereinafter as the "Name Over Method (NOM) Framework".

The NOM Framework allows entities, for example businesses and/or individuals, to list ways that a person can connect with them. An entity may be a registrant of one or more domain names. For example, the entity can list contact information for contact by telephone, Whatsapp™, Instagram™, Pinterest™, Facebook™, Twitter™ and others as well as new social media platforms yet to be invented. Examples of contact identifiers include, but are not limited to, phone numbers, GPS coordinates, Facebook™ pages and more. This contact information is stored in association with the domain name of the entity. The NOM Framework also defines how the contact information can be retrieved for a given domain name. It is extensible and can accommodate future communication methods.

The NOM Framework allows domain name owners to store contact information in the DNS in association with the domain name. Subsequently, a user can use the DNS to translate domain names into contact information using specially formatted DNS records referred to hereinafter as "NOM Records". A NOM Record comprises one or more resource records.

A domain name owner can create their own NOM Record using the NOM Framework if they have access to their DNS settings. This type of NOM Record is referred to hereinafter as an "Independent NOM Record". Many domain name owners will lack the technical expertise to create their own Independent NOM Record.

A hosted service is available within the NOM Framework in which a NOM Record is hosted on behalf of the domain name owner. This type of NOM record is referred to hereinafter as a "Hosted NOM Record". A Hosted NOM Record may be managed and/or contact information stored therein may be updated for example using a web interface.

In this example, the data communications network 300 comprises a first apparatus 301, a second apparatus 302, a third apparatus 303 and a fourth apparatus 304. In this example, the four apparatuses 301, 302, 303, 304 are interconnected via a computer network 305. In this example, the computer network 305 is the Internet.

In this example, the first apparatus 301 is a user device comprising DNS query functionality referred to hereinafter as the "NOM Interrogator". In this example, the NOM Interrogator is a piece of software. The NOM Interrogator may for example be a smartphone application, a web application, a satellite navigation system application, a smart TV application or another program run on any other device. The NOM Interrogator makes requests to the DNS system, retrieves NOM Records and processes, for example displays, the results. Queries to the NOM Framework may be made in the same way as standard DNS queries, namely over UDP on port 53.

The NOM Interrogator is responsible for formatting and displaying NOM Records, for example for display to a user. The way a NOM Record is displayed may vary depending on one of more factors. An example of such a factor is the NOM Interrogator and/or user device type. For example, a satellite navigation system may disregard all data except for GPS coordinates and display this data as a location on a map. This type of NOM Interrogator may allow a GPS system to navigate to a location listed for a domain name. A telephone dialler may disregard all data except for telephone numbers. The telephone dialler may dial the number as soon as it is returned. The telephone dialler may display a choice of numbers to dial if multiple numbers are returned, displaying a label for each telephone number.

Searching for contact information for a domain name using the NOM Interrogator is referred to hereinafter as a "NOM Lookup". A NOM Lookup can be performed for any domain name. A NOM Lookup corresponds to a DNS query.

In this example, the second apparatus 302 is a name server, referred to hereinafter as the "Independent Server". The Independent Server 302 stores Independent NOM Records. Independent NOM Records are written directly into the authoritative DNS resource records of a domain name.

In this example, the third apparatus 303 is a name server, referred to hereinafter as the "NOM Server". The NOM Server 303 hosts Hosted NOM Records. Hosted NOM Records are stored within the DNS resource records of the NOM Server 303 on the behalf of an entity associated with a domain name. An example of such an entity is the Registrant of the domain name. Other examples of such an entity include a business that wishes to have their contact details associated with the domain name, even if they are not the Registrant of the domain, as will be described in more detail below.

In this example, the fourth apparatus 304 is a server hereinafter referred to as the "NOM Bot". In some examples, the NOM Bot 304 automatically creates NOM Records for domains that have neither an Independent NOM Record nor a Hosted NOM Record. If a NOM Lookup is performed for a domain name which does not already have a NOM Record, in some examples the NOM Bot 304 creates a new NOM Record based on content of the website shown on the domain name. The NOM Bot 304 gathers the contact information shown on the website and creates a NOM Record based on the contact information on the website.

Although the NOM Bot 304 is shown as separate from other apparatuses 301, 302, 303 in the data communications network 300 in this example, some or all of its functionality can be incorporated into one or more of the other apparatuses 301, 302, 303, as will be described in more detail below. For example, the NOM Bot 304 functionality may be provided by hardware and/or software in the user device 301.

A NOM Record is a record comprising one or more specially formatted DNS resource records which include contact information associated with an entity associated with a domain name. The one or more resource records may consist solely of resource records of a TXT type. TXT resource records allow any text to be stored. TXT resource records are already used for SPF as seen in the zone file example shown above as well as for other limited uses.

In this example, the contact information in the NOM record is stored in plaintext form. In other words, the contact information is stored in an unencrypted form. Storing the contact information in plaintext form facilitates access to the contact information.

A NOM Lookup requests NOM Records using a DNS query. An example form of the DNS query, where <<domain_to_lookup>> is used a placeholder for example purposes, is:

<<domain_to_lookup>>. IN TXT

An example form of DNS response to the NOM Lookup, where <<domain_to_lookup>> is again used a placeholder for example purposes, and where <<nom_record_content>> indicates the content of the NOM Record, is:

```
<<domain_to_lookup>>.    3600    IN TXT
"<<nom_record_content>>"
```

Unlike SPF, in some examples, NOM Records are not stored in the root of the domain name. Instead, in the case of Independent NOM Records, they are stored in their own subdomain. An example of such a subdomain is "nomrecordlookup". This helps to keep the DNS efficient and uncluttered.

In some examples, A NOM Lookup for the domain name "example.com" would involve a DNS query for the subdomain "nomrecordlookup.example.com". In other words, at least one label is prefixed to the domain name for which contact information is sought, the label being "nomrecordlookup" in this example. Such a DNS query would be made to the authoritative name server for the "nomrecordlookup" sub-domain of the domain name to which the NOM Lookup relates. This type of NOM Lookup is referred to hereinafter as an "Independent NOM Domain Name Lookup". An example of the form of a DNS query for an Independent NOM Domain Name Lookup for the domain name "example.com" is:

nomrecordlookup.example.com. IN TXT

In this example, only TXT resource records are requested, as opposed to any type of resource record. Any type of resource record would be requested by including the type identifier "ANY" in the request. Requesting just TXT resource records allows the query and response to be handled quickly. In this example, only TXT resource records would be returned. If no answer is received, then the query fails. If an answer is received but the answer does not include a NOM Record, the query fails.

In some examples, if the first query fails, a second NOM Lookup is made to the NOM Server 303. This type of NOM Lookup is referred to hereinafter as a "Hosted NOM Domain Name Lookup". In this example, the domain name being queried ("example.com") is prefixed to at least one label. In some examples, the at least one label forms part of a resolvable domain name. In this example the resolvable domain name that is added after the domain name for which contact information is sought is "lookup.nomserver.com". This resolvable domain name comprises three labels, namely "lookup", "nomserver" and "com". The domain name "lookup.nomserver.com" is resolvable if a DNS query for the domain name "lookup.nomserver.com" results in a DNS response. An example of the form of a DNS query for a Hosted NOM Domain Lookup for the domain name "example.com" is:

example.com.lookup.nomserver.com. IN TXT

If the second NOM Lookup also fails, a third stage may follow in which a NOM Record is automatically created by the NOM Bot 304 based on the website content published on the domain name. This third stage can be achieved in various different ways as will be described below in more detail.

An Independent NOM Record is returned from the Independent Server 302 in the following format:

```
nomrecordlookup.example.com.  3600    IN TXT    "v=NOM1|t=
r|n=Example Company
Ltd|tel=General:0123456789|tel=Support:0123498765|fb=nomfb|tw=
nomtwitter|."
```

In the example above, the Independent NOM Record has line breaks due to the format of this document, but there are no line breaks included in the NOM Record itself. The Independent NOM Record includes a first part, which follows standard DNS response formatting:

nomrecordlookup.example.com. 3600 IN TXT

The item "nomrecordlookup.example.com." is the zone being queried. The item "3600" is the TTL in seconds. The TTL shows how long the record can be cached for. The item "IN" indicates the class of the response. The item "TXT" indicates the type of DNS resource record returned.

The Independent NOM Record includes a second part, which comprises the contact information associated with the domain name "example.com". In this example, the part comprising the contact information, with line breaks added for clarity, is:

```
"v=NOM1|t=r|n=Example Company Ltd|
tel=General:0123456789|tel=Support:0123498765|
fb=nomfb|tw=nomtwitter|."
```

When returning a TXT resource record, the Independent Server 302 encloses the data in quotes. In some examples, the syntax of NOM Records dictate that each data piece should be split with the pipe ("|") character.

The item "v=NOM1" shows that the TXT resource record is a NOM Record using version 1 of the NOM syntax. This item is similar to the format used in SPF records and in other uses of TXT records. The version number allows different interpretations to be specified for different syntaxes as the NOM Framework develops.

The item "t=r" indicates the "type" of the NOM Record. In this example, "r" means "Root". This allows for further extension of the NOM Framework in the future. The item "n=Example Company Ltd" is the name of the company that the NOM Record is for.

The item "tel=General:0123456789" comprises a contact identifier. "tel" indicates that the contact identifier is a telephone number. "General" indicates that the telephone number is for general enquiries. The number "0123456789" is the telephone number itself. The item "tel=Support: 0123498765" is similar except that the telephone number "0123498765" is for "Support".

The item "fb=nomfb" comprises a contact identifier. "fb" indicates that the contact identifier relates to a Facebook™ profile. In this case the contact method associated with the contact identifier is Facebook™. The contact identifier could be prefixed with the contact method URL when displayed to the user, in this case "http://www.facebook.com", to provide a link to a Facebook™ page.

The item "tw=nomtw" comprises a contact identifier. "tw" indicates that the contact identifier relates to a Twitter™ profile. In this case, the contact method associated with the contact identifier is Twitter™. The contact identifier could be prefixed with the contact method URL when displayed to the user, in this case "http://www.twitter.com", to provide a link to a Twitter™ page.

The final full stop (.) indicates the end of the NOM Record.

The example NOM Record is solely for illustrative purposes. Other contact identifiers relating to different contact methods can be included in a NOM Record, for example "gps" geographical contact identifiers and more.

DNS TXT resource records are limited to 255 characters. If the NOM Record exceeds this limit, the TXT resource records may be chained together as follows:

```
nomrecordlookup.example.com. 3600    IN TXT
"v=NOM1|t=r|p=1/2|n=Example Company
Ltd|tel=General:0123456789|tel=Support:0123498765|
tel=Sales:0123400000|tel=Customer Service:01234500000|
tel=Accounts:0123456000|fb=nomfb|tw=nomtwitter|li=nomlinkedin|
in=nominstagram|gps=51.50500,-0.019611|."
nomrecordlookup.example.com. 3600    IN TXT
"v=NOM1|t=r|p=2/2|em=nospamplease@example.com|."
```

In the example above, there is a "p" variable present. This variable indicates the number of parts the NOM Record has. "p=1/2" means part one of two.

Multiple NOM Records can be stored as Independent NOM Records, for example at nomrecordlookup.example.com, or as Hosted NOM Records, for example at example.com.lookup.nomserver.com. Such NOM Records are concatenated in the correct order and then processed.

Figure 4:
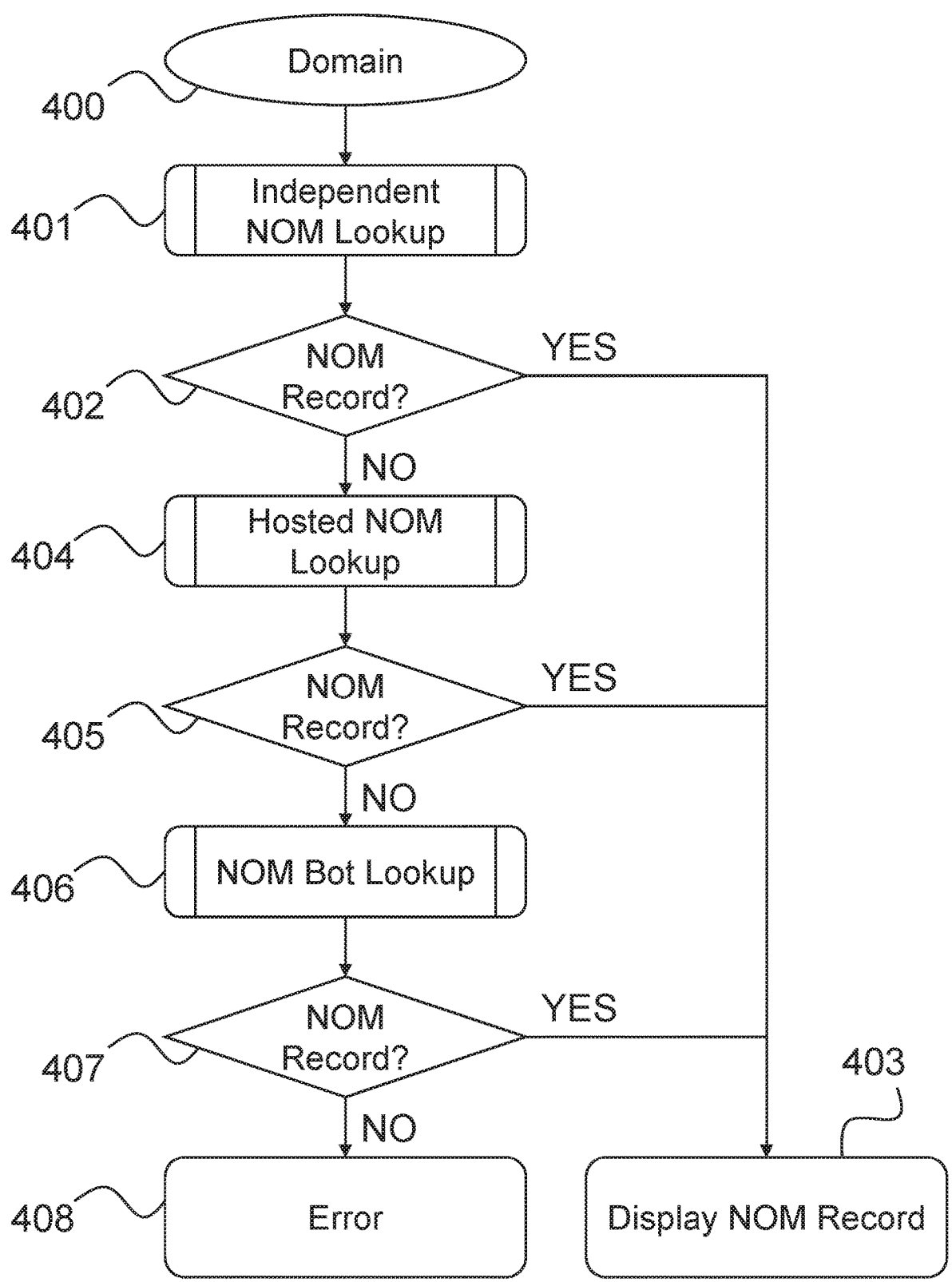
FIG. 4 shows a flowchart illustrating schematically an example of a method in accordance with an embodiment of the present invention.

Referring to FIG. 4, there is shown a flowchart illustrating an example of a method of processing data. In this example, the method is associated with a NOM Lookup.

At 400, a domain name is identified. For example, the user may enter the domain name. In this example, the domain name is "example.com".

At 401, an Independent NOM Domain Name Lookup is performed. An Independent NOM Domain Name Lookup involves prefixing the domain name "example.com" with one or more labels, for example "nomrecordlookup", and a dot. In this example, the term "nomrecordlookup." is prefixed to "example.com" to form a lookup domain name of "nomrecordlookup.example.com".

At 402, it is determined whether the Independent NOM Domain Name Lookup performed at 401 resulted in a NOM Record being returned.

If the result of the determination at 402 is that a NOM Record is returned, then the NOM Record is displayed at 403.

If the result of the determination at 402 is that a NOM Record is not returned, then a Hosted NOM Domain Name Lookup is performed at 404. A Hosted NOM Domain Name Lookup involves adding one or more labels after the domain name "example.com", for example "lookup.nomserver.com". In this example, "example.com", "lookup.nomserver.com" and "example.com.lookup.nomserver.com" are all resolvable domain names.

At 405, it is determined whether the Hosted NOM Domain Name Lookup performed at 404 resulted in a NOM Record being returned.

If the result of the determination at 405 is that a NOM Record is returned, then the NOM Record is displayed at 403.

If the result of the determination at 405 is that a NOM Record is not returned, then a NOM Bot Lookup is performed at 406.

At 407, it is determined whether the NOM Bot Lookup performed at 406 resulted in a NOM Record being returned.

If the result of the determination at 407 is that a NOM Record is returned, then the NOM Record is displayed at 403.

If the result of the determination at 407 is that a NOM Record is not returned, then a predetermined action is taken. In this example, the predetermined action involves an error message being returned and displayed. For example the message "No NOM Record found for this domain name" may be displayed.

In this example, items 400, 402, 403, 405, 407 and 408 are performed by the NOM Interrogator. In this example, items 401, 404 and 406 involve at least one other apparatus than the user device on which the NOM Interrogator is located.

Figure 5:
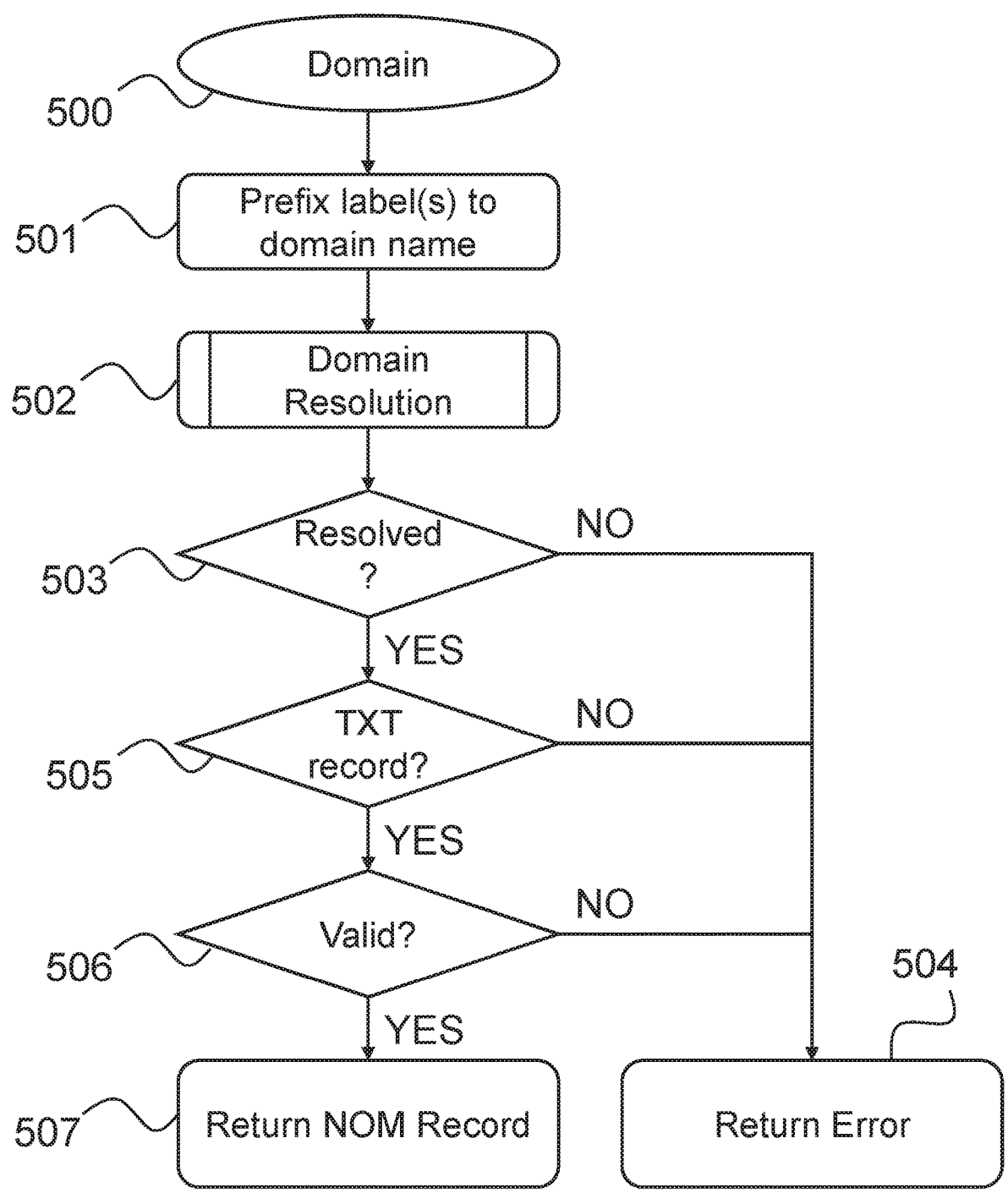
FIG. 5 shows a flowchart illustrating schematically an example of a method in accordance with an embodiment of the present invention.

Referring to FIG. 5, there is shown a flowchart illustrating an example of a method of processing data. In this example, the method is associated with an Independent NOM Domain Name Lookup. In this example, an Independent NOM Record for a given domain is stored within the domain zone file on the authoritative server for the given domain under the "nomrecordlookup" subdomain.

At 500, a domain name is identified. For example, the domain name may be provided by the user. In this example, the domain name is "example.com".

At 501, the identified domain name is prefixed with one or more labels. In this example, the identified domain is prefixed with the label "nomrecordlookup", and a dot. In this example, the term "nomrecordlookup." is prefixed to "example.com" so that a lookup domain name "nomrecordlookup.example.com" is obtained.

In this example, the domain name "nomrecordlookup.example.com" is a first domain name and the domain name "example.com" is a second domain name. The first domain name "nomrecordlookup.example.com" includes the second domain name "example.com". The first domain name "nomrecordlookup.example.com" further includes at least one label preceding the "example.com". In this example, the label is "nomrecordlookup".

At 502, domain name resolution is performed using the obtained domain name "nomrecordlookup.example.com". This may involve performing a DNS query using the domain name "nomrecordlookup.example.com".

At 503, it is determined whether the domain name resolution performed at 502 resulted in the domain name being resolved.

If the result of the determination at 503 is that the domain name did not resolve, then a predetermined action is taken at 504. In this example, the predetermined action involves an error being returned.

If the result of the determination at 503 is that the domain name did resolve, then a determination is made at 505 whether there is a TXT resource record.

If the result of the determination at 505 is that there is not a TXT resource record, then the predetermined action is taken at 504.

If the result of the determination at 505 is that there is a TXT record, then a determination is made at 506 whether the TXT resource record is a valid NOM Record.

If the result of the determination at 506 is that the TXT resource record is not a valid NOM Record, then the predetermined action is taken at 504.

If the result of the determination at 506 is that the TXT resource record is a valid NOM Record, then the NOM Record is returned at 507.

Figure 6:
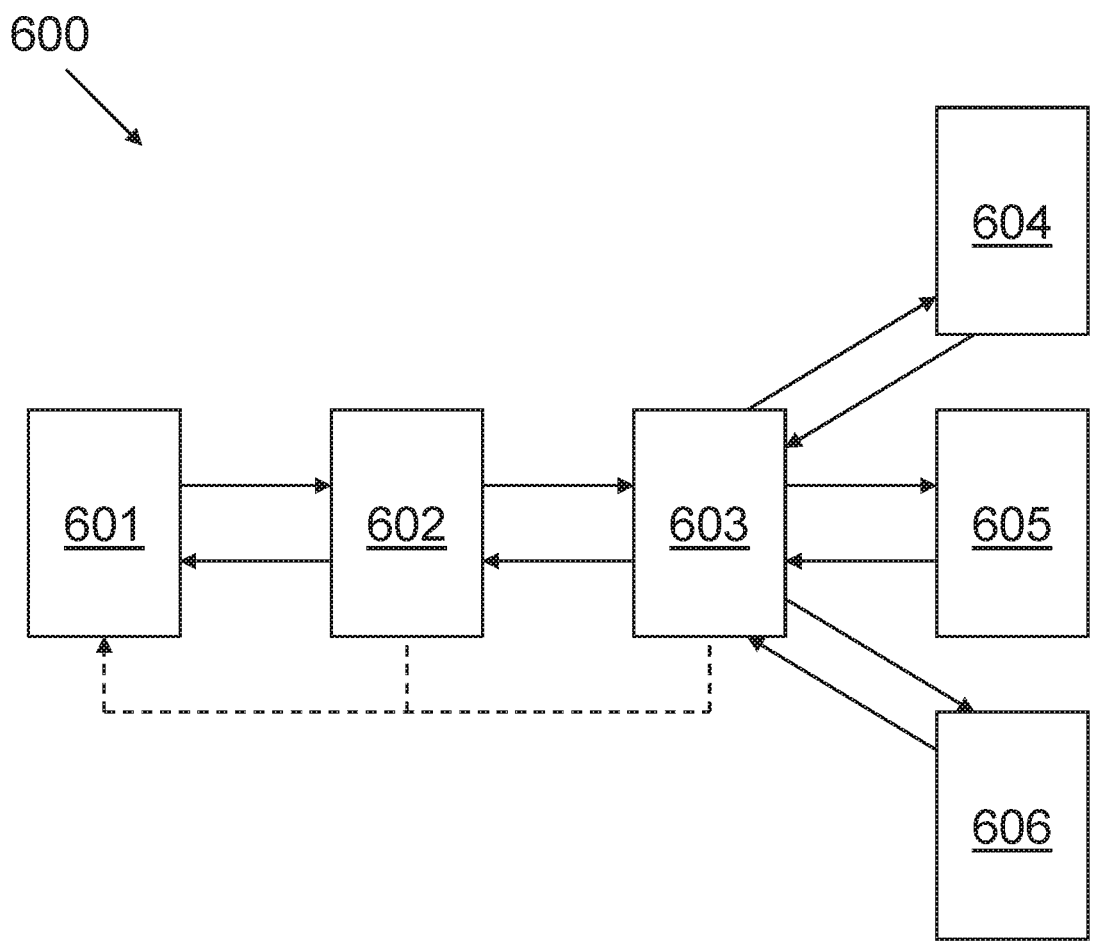
FIG. 6 shows a schematic block diagram of an example of a data processing network in accordance with an embodiment of the present invention.

Referring to FIG. 6, there is shown a schematic representation of an example of a data communications network 600. In this example, the data communications network 600 is used to perform an Independent NOM Domain Name Lookup. In this example, the user has entered the domain name "example.com" and wishes to obtain contact information associated with an entity associated with that domain name.

In this example, the data communications network 600 comprises a user device 601 comprising the NOM Interrogator, a local network 602, a DNS resolver 603 and three name servers 604, 605, 606.

In this example, the NOM Interrogator on the user device 601 makes an Independent NOM Domain Name Lookup in relation to the domain name "example.com". In this example, the NOM Interrogator requests TXT resource records only using the lookup domain name "nomrecordlookup.example.com".

If no resource records for the domain name "nomrecordlookup.example.com" are cached in the local network 602, the query is forwarded to the DNS resolver 603.

The DNS resolver 603 resolves the lookup domain "nomrecordlookup.example.com" starting with the right-most label. In this example, the right-most label is the "com" TLD.

In this example, the name server 604 is a root server, which returns the IP address of the authoritative name server 605 for the "com" TLD.

The DNS resolver 603 requests the authoritative name server for the domain name "example.com" from the authoritative name server 605 for the domain name "com".

The authoritative name server 605 for the domain name "com" returns the name server address for the authoritative name server for the domain name "example.com". The DNS resolver 603 resolves the name server address for the authoritative name server for the domain name "example.com" into an IP address of the authoritative name server 606 for the domain name "example.com".

The DNS resolver 603 requests the authoritative name server for the domain name "nomrecordlookup.example.com" from the authoritative name server 606 for the domain name "example.com".

The authoritative name server 606 for the domain name "example.com" returns the name server address for the authoritative name server 606 for the domain name "nomrecordlookup.example.com". If found, the DNS resolver 603 resolves this name server address into an IP address for the authoritative name server 606 for the domain name "nomrecordlookup.example.com".

The DNS resolver 603 requests the NOM Record for the domain name "nomrecordlookup.example.com" from the authoritative name server 606 for the domain name "nomrecordlookup.example.com" or returns an error if no authoritative name server was found for the domain name "nomrecordlookup.example.com". In this example, the NOM Record comprises one or more specially formatted DNS TXT resource records.

Assuming the authoritative name server for the domain name "nomrecordlookup.example.com" was found, the authoritative name server 606 for the domain name "nomrecordlookup.example.com" returns the NOM Record for "nomrecordlookup.example.com" or returns an error if the NOM Record does not exist.

The DNS resolver 603 passes the result to the local network 602. If an authoritative name server was not found for the domain name "nomrecordlookup.example.com", the DNS resolver 603 returns an error rather than a NOM Record.

The NOM Interrogator receives and processes the response. If the response is in a valid NOM format, in some examples the process completes. If the response was an error or was in an invalid format the NOM Interrogator may perform one or more further actions. In some examples, the one or more further actions include performing a Hosted NOM Domain Name Lookup, as will now be described with reference to FIGS. 7 and 8.

Figure 7:
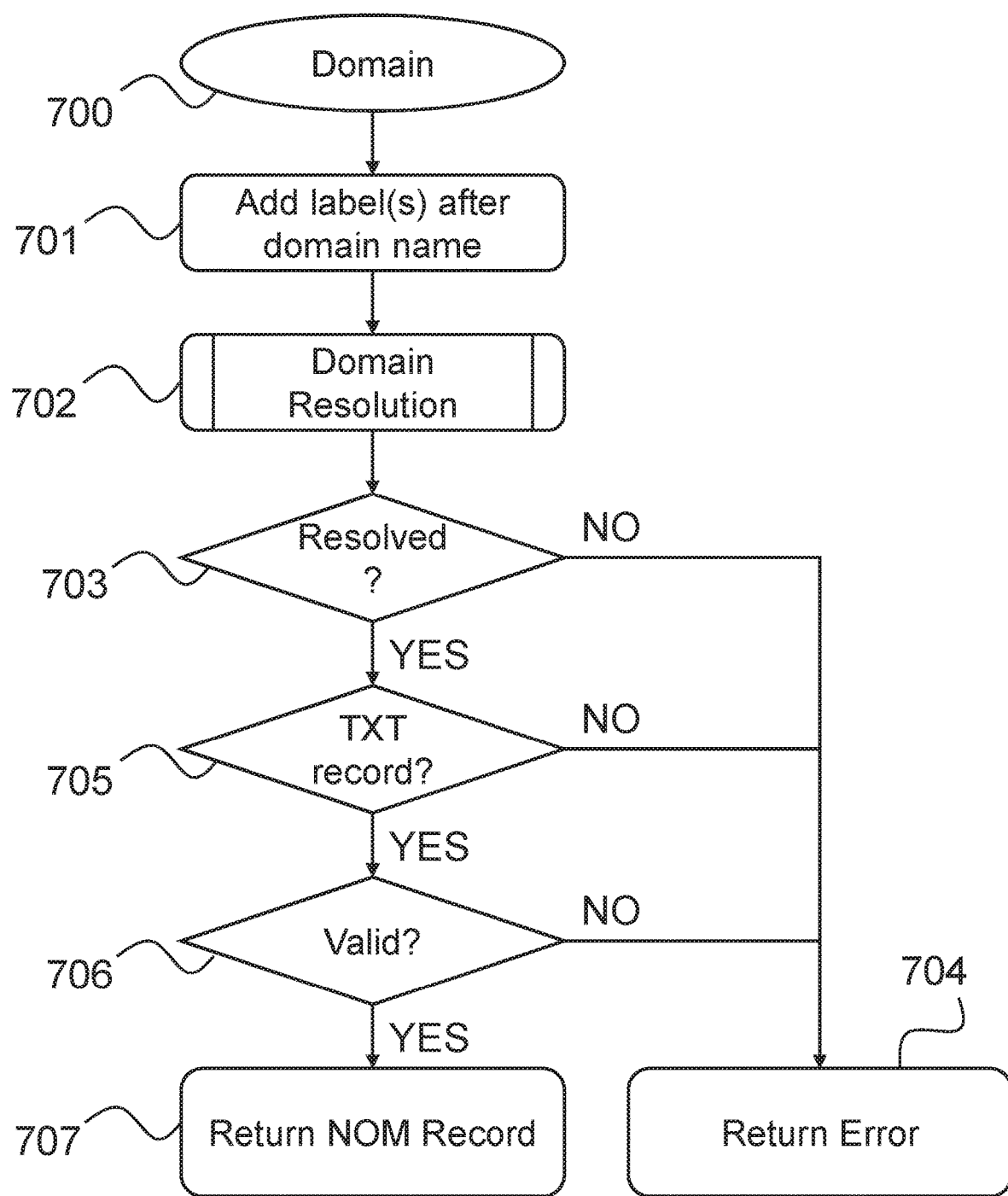
FIG. 7 shows a flowchart illustrating schematically an example of a method in accordance with an embodiment of the present invention.

Referring to FIG. 7, there is shown a flowchart illustrating an example of a method of processing data. In this example, the method is associated with a Hosted NOM Domain Name Lookup. In this example, NOM Records are stored within the domain zone file of the NOM Server at subdomains of the domain name "lookup.nomserver.com". Hosting NOM Records allows the distributed nature of DNS and caching to be used. The domain name "lookup.nomserver.com" comprises three labels "lookup", "nomserver" and "com" and is a resolvable domain name.

At 700, a domain name is identified. In this example, the domain name is "example.com".

At 701, three labels, "lookup", "nomserver" and "com" are added to the end of the identified domain name "example.com" in the form "lookup.nomserver.com" so that a domain name "example.com.lookup.nomserver.com" is obtained.

In this example, the domain name "example.com.lookup.nomserver.com" is a first domain name and the domain name "example.com" is a second domain name. The first domain name "example.com.lookup.nomserver.com" includes the second domain name "example.com". The first domain name includes at least one label following the second domain name. In this example, the first domain name includes three labels following the second domain name, namely "lookup", "nomserver" and "com". The label "com" corresponds to a TLD. The label "nomserver" corresponds to a second-level domain name. The label "lookup" corresponds to a third-level domain name. The at least one label following the second domain name, in the first domain name, forms part of a resolvable domain name. In this example, each of the three labels "lookup", "nomserver" and "com" following the second domain name "example.com" forms part of a resolvable third domain name. In this example, the resolvable third domain name is "lookup.nomserver.com". The second domain name "example.com" is also a resolvable domain name in that the domain name "example.com" resolves to a given IP address itself.

In this example, there are no labels in the first domain name "example.com.lookup.nomserver.com" prior to the second domain name "example.com". In other words, no labels in the first domain name precede the second domain name. As such, the second domain name "example.com" is at the left-most end of the first domain name "example.com.lookup.nomserver.com".

In this example, there is an authoritative name server for the domain name "example.com.lookup.nomserver.com" and a further authoritative name server for the domain name "example.com". In this example, the two authoritative name servers are different from each other.

At 702, domain name resolution is performed using the obtained domain name "example.com.lookup.nomserver.com".

At 703, it is determined whether the domain name resolution performed at 702 resulted in the domain name being resolved.

If the result of the determination at 703 is that the domain name did not resolve, then a predetermined action is taken at 704. In this example, the predetermined action involves an error message being returned.

If the result of the determination at 703 is that the domain name did resolve, then a determination is made at 705 whether there is a TXT resource record.

If the result of the determination at 705 is that there was is a TXT resource record, then the predetermined action is taken at 704.

If the result of the determination at 705 is that there is a TXT resource record, then a determination is made at 706 whether the TXT resource record is a valid NOM Record.

If the result of the determination at 706 is that the TXT resource record is not a valid NOM Record, then the predetermined action is taken at 704.

If the result of the determination at 706 is that the TXT record is a valid NOM Record, then the NOM Record is returned at 707.

Figure 8:
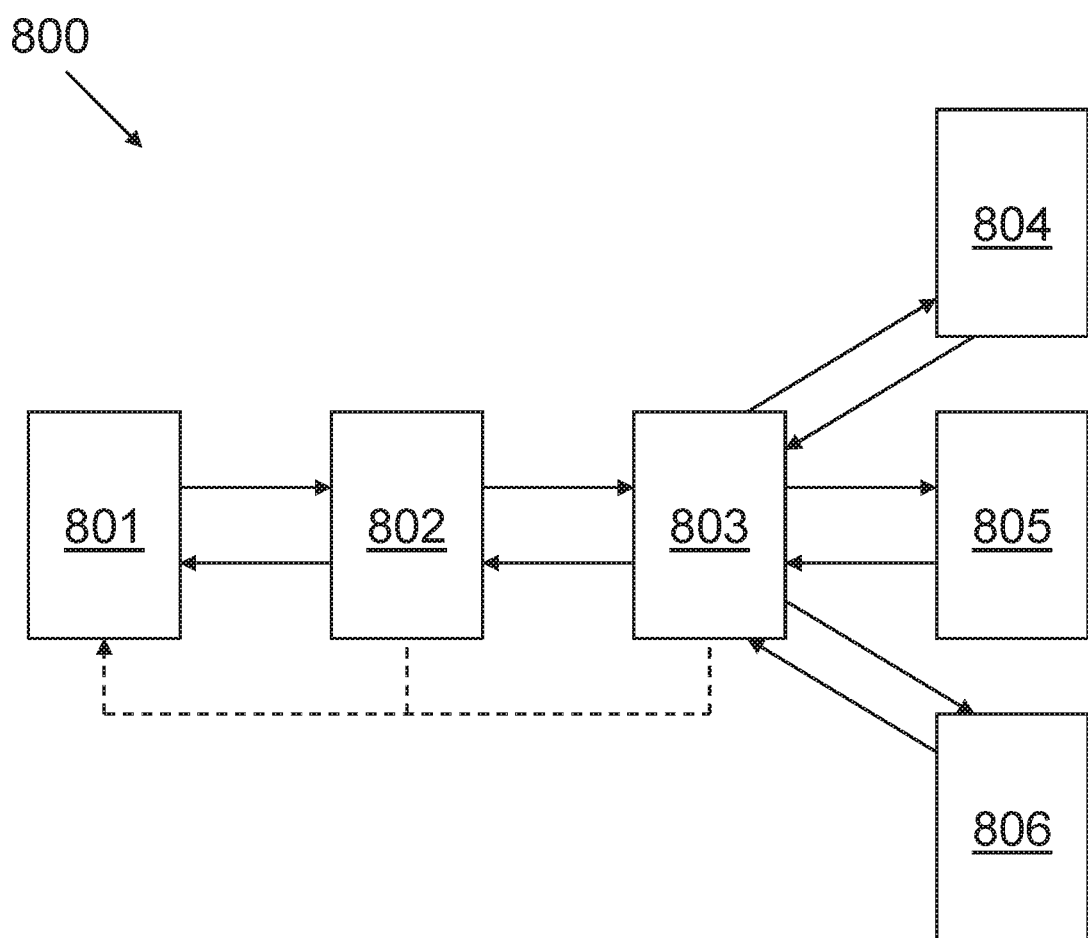
FIG. 8 shows a schematic block diagram of an example of a data processing network in accordance with an embodiment of the present invention.

Referring to FIG. 8, there is shown a schematic block diagram illustrating an example of a data communications network 800. In this example, the data communications network 800 is used to perform a Hosted NOM Domain Name Lookup. In this example, the Hosted NOM Domain Name Lookup requests only TXT resource records, using the lookup domain name "example.com.lookup.nomserver.com".

In this example, the data communications network 800 comprises a user device 801 comprising the NOM Interrogator, a local network 802, a DNS resolver 803 and three name servers 804, 805, 806.

If resource records for the domain name "example.com.lookup.nomserver.com" are not cached in the local network 802, the query for the domain name "example.com.lookup.nomserver.com" is forwarded to the DNS resolver 803.

The DNS resolver 803 resolves the lookup domain "example.com.lookup.nomserver.com" starting with the right-most label. In this example, the right-most label is the "com" TLD.

In this example, name server 804 is a root server, which returns the IP address of the authoritative name server 805 for the "com" TLD.

The DNS resolver 803 requests the authoritative name server for the domain name "nomserver.com" from the authoritative name server 805 for the domain name "com".

The authoritative name server 805 for the domain name "com" returns the authoritative name server address for the domain name "nomserver.com". The DNS resolver 803 resolves the authoritative name server address for the domain name "nomserver.com" into an IP address of the authoritative name server 806 for the domain name "nomserver.com".

The DNS resolver 803 requests the authoritative name server for the domain name "lookup.nomserver.com" from the authoritative name server 806 for the domain name "nomserver.com".

The authoritative name server 806 for the domain name "nomserver.com", which in this example is the NOM Server, returns the authoritative name server for the domain name "lookup.nomserver.com". The DNS resolver 803 resolves the authoritative name server address for the domain name "lookup.nomserver.com" into an IP address of the authoritative name server 806 for the domain name "lookup.nomserver.com".

The DNS resolver 803 requests the authoritative name server for the domain name "com.lookup.nomserver.com" from the authoritative name server 806 for the domain name "lookup.nomserver.com".

The authoritative name server 806 for the domain name "lookup.nomserver.com", which in this example is the NOM Server, returns the authoritative name server for the domain name "com.lookup.nomserver.com". The DNS resolver 803 resolves the authoritative name server address for the domain name "com.lookup.nomserver.com" into an IP address of the authoritative name server 806 for the domain name "com.lookup.nomserver.com".

The DNS resolver 803 requests the authoritative name server for the domain name "example.com.lookup.nomserver.com" from the authoritative name server 806 for the domain name "com.lookup.nomserver.com".

The authoritative name server 806 for the domain name "com.lookup.nomserver.com", which in this example is the NOM Server, returns the authoritative name server address for the domain name "example.com.lookup.nomserver.com". The DNS resolver 803 resolves the authoritative name server address for the domain name "example.com.lookup.nomserver.com" into an IP address of the authoritative name server 806 for the domain name "example.com.lookup.nomserver.com".

The DNS resolver 803 requests the NOM Record for the domain name "example.com.lookup.nomserver.com" from the authoritative name server 806 for the domain name "example.com.lookup.nomserver.com" or returns an error if no authoritative name server was found for the domain name "example.com.lookup.nomserver.com". In this example, the NOM Record is a specially formatted DNS TXT resource record. In this example, the NOM Record comprises one or more resource records of a TXT type.

As such, in this example, the authoritative name server for the domain name "example.com.lookup.nomserver.com" receives a domain name system query for the domain name "example.com.lookup.nomserver.com". In this example, the authoritative name server for the domain name "example.com.lookup.nomserver.com" is the name server 806. The name server 806 processes the received domain name system query for the domain name ("example.com.lookup.nomserver.com"). Processing the received domain name system query involves obtaining one or more resource records associated with the domain name "example.com.lookup.nomserver.com". The one or more resource records include contact information associated with an entity associated with the domain name "example.com".

Assuming the authoritative name server for the domain name "example.com.lookup.nomserver.com" was found, the authoritative name server 806 for the domain name "example.com.lookup.nomserver.com" returns the NOM Record for "example.com.lookup.nomserver.com" or returns an error if the NOM Record does not exist. In this example, the one or more resource records comprised in the NOM Record are in a zone file describing the first domain name "example.com.lookup.nomserver.com". In some examples, the authoritative name server for the domain name "example.com.lookup.nomserver.com" has previously stored the one or more resource records in the zone file describing the first domain name "example.com.

lookup.nomserver.com". In some examples, the authoritative name server for the domain name "example.com.lookup.nomserver.com" retrieves the one or more resource records from the zone file describing the first domain name "example.com.lookup.nomserver.com".

In some examples, the one or more resource records comprise a plurality of resource records. For example, there may be a plurality of chained resource records.

As such, the authoritative name server for the domain name "example.com.lookup.nomserver.com" transmits a response to the domain name system query for the domain name "example.com.lookup.nomserver.com". The response includes the one or more resource records comprising the contact information associated with the entity associated with the domain name "example.com". In this example, the response to the domain name system query comprises only the one or more resource records comprised in the NOM Record.

The DNS resolver 803 passes the result to the local network 802. If an authoritative name server was not found for the domain name "example.com.domain.nomserver.com", the DNS resolver 803 returns the error rather than a NOM Record.

The NOM Interrogator on the user device 801 receives the response. If the response is in a valid NOM format, the process may complete. If the response is an error or was in an invalid format the NOM Interrogator performs one or more further actions. In some examples, the one or more further actions include performing a NOM Bot Lookup, as will be described below with reference to FIGS. 9 to 11.

In this example, the user device 801 transmits a domain name system query for a first domain name "example.com.lookup.nomserver.com". The user device 801 receives a response to the domain name system query for the first domain name "example.com.lookup.nomserver.com". The response comprises one or more resource records comprising contact information associated with an entity associated with a second, different domain name "example.com". The user device 801 processes the response to the domain name system query for the first domain name "example.com.lookup.nomserver.com". Processing involves identifying the contact information associated with the entity associated with the second domain name "example.com" in the one or more resource records.

Figure 9:
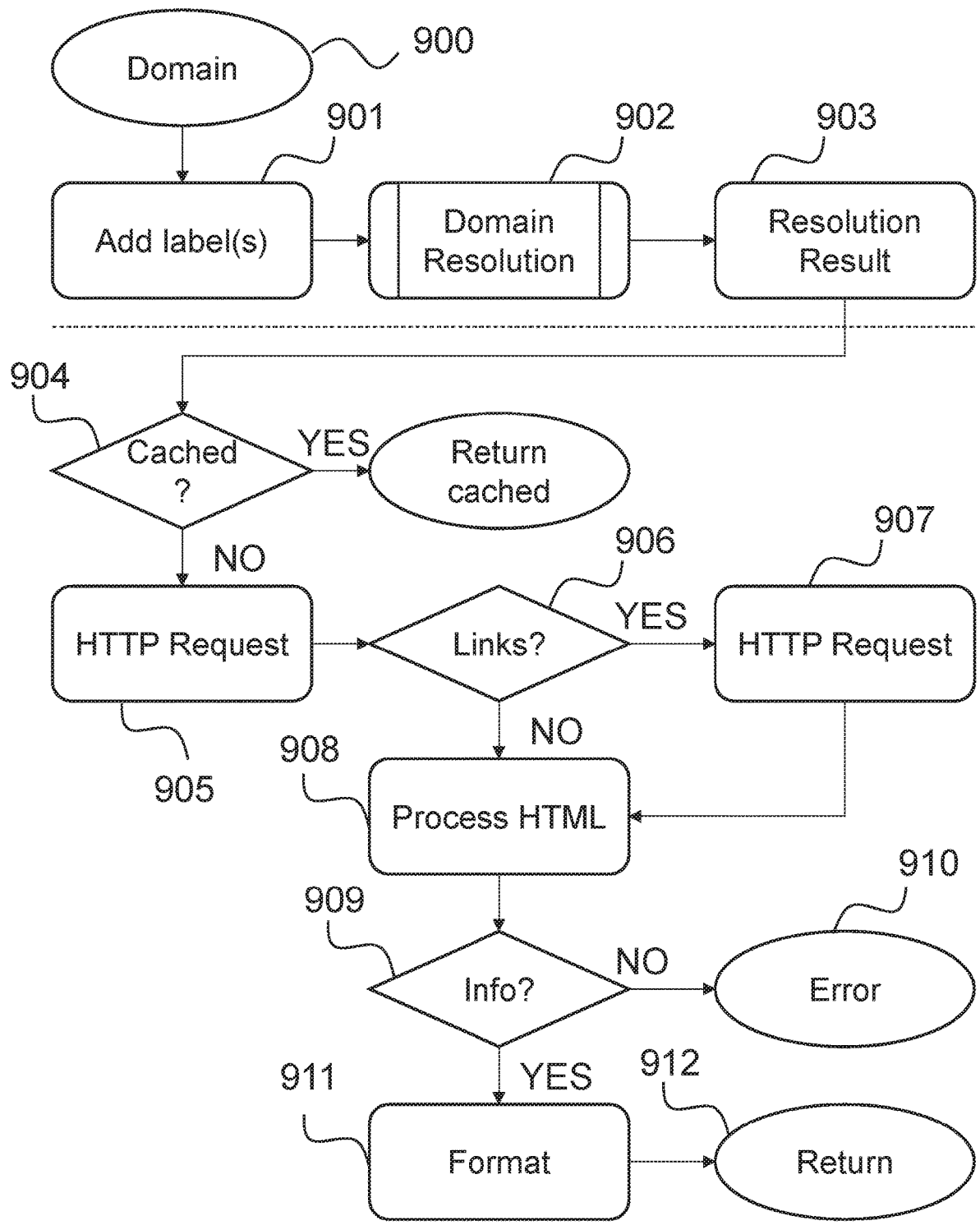
FIG. 9 shows a flowchart illustrating schematically an example of a method in accordance with an embodiment of the present invention.
Figure 10:
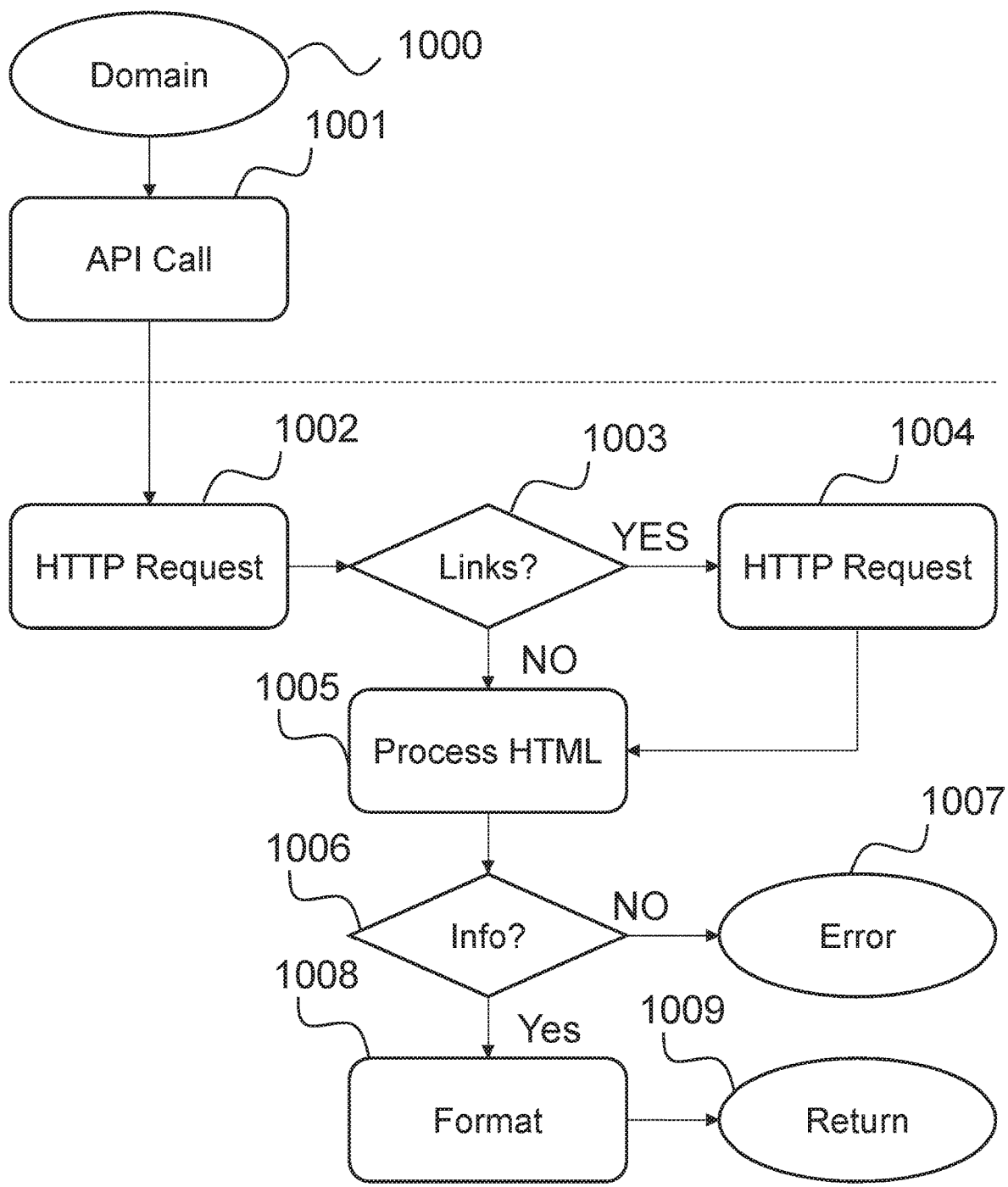
FIG. 10 shows a flowchart illustrating schematically an example of a method in accordance with an embodiment of the present invention.
Figure 11:
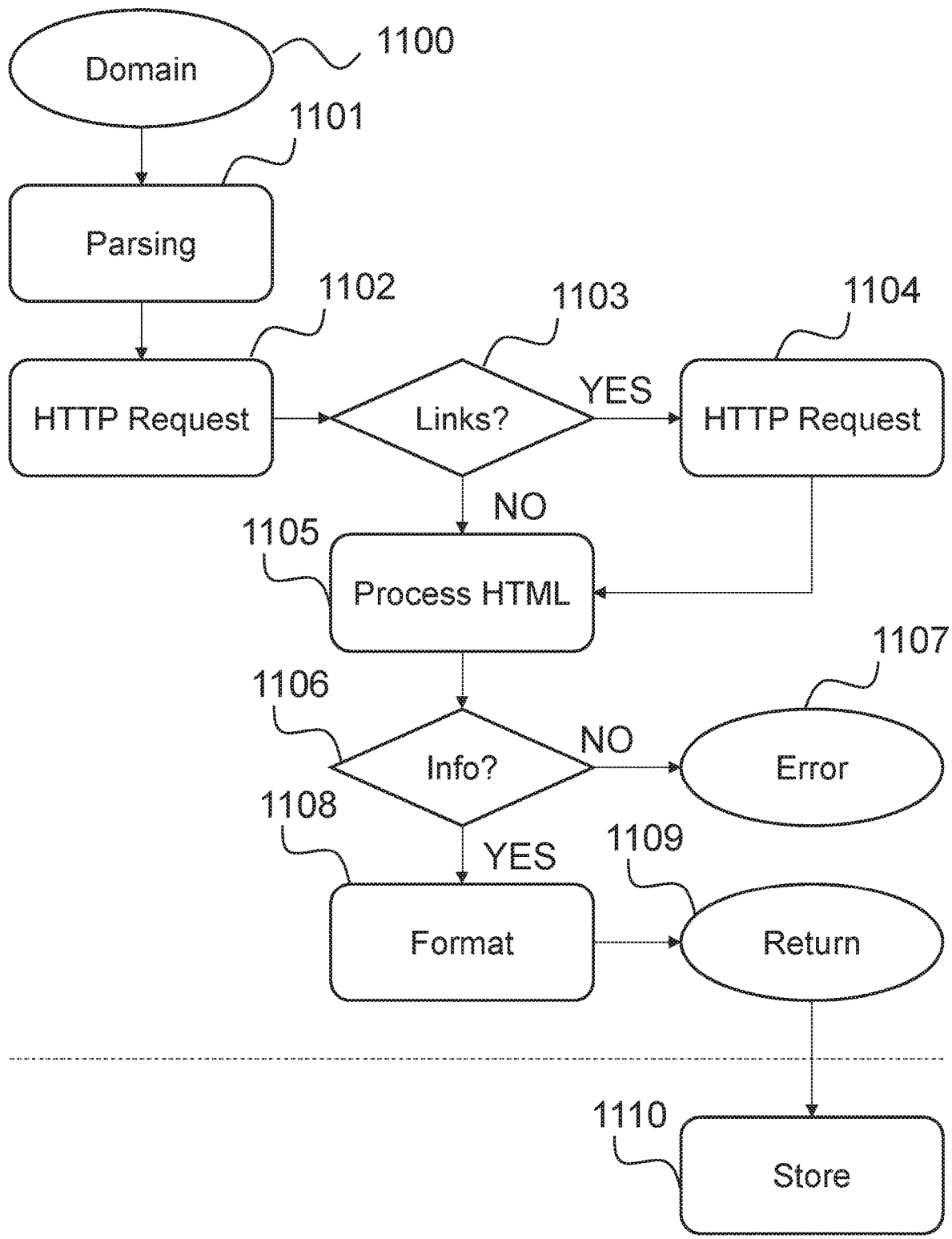
FIG. 11 shows a flowchart illustrating schematically an example of a method in accordance with an embodiment of the present invention.

If a user requests a NOM Record for a domain name which has neither an Independent NOM Record nor a Hosted NOM Record, the NOM Bot tries to automatically create a NOM Record based on the website content shown on the domain name. The NOM Bot parses the HTML content on the website and gathers contact information from this content. There are various different ways in which the NOM Bot process may be initiated. Three example techniques will now be provided with reference to FIGS. 9, 10 and 11. Two of these example techniques, described with reference to FIGS. 9 and 10, are "server-side" techniques. In these two server-side examples, the NOM Bot process runs on server infrastructure. One of these examples techniques, described with reference to FIG. 11 is "client-side". In the client-side example, the process runs on the user device.

Each of the implementations described below initiates the NOM Bot to gather and parse HTML content. To do this, each method requests the website for the domain name "example.com" by HTTP on port 80. The web server responsible for the domain name "example.com" returns the HTML for the homepage. The HTML is parsed for links and a list of the links that could include contact information for the company is made. These pages are referred to hereinafter as "potential contact pages".

The NOM Bot finds these potential contact pages by evaluating the link text used and the page URL. Example HTML the NOM Bot may obtain is:

```
<html>
<body>
To find out more please <a href="page1.html">contact us</a>.
</body>
</html>
```

Another example of HTML content the NOM Bot may obtain is:

```
<html>
<body>
To contact us <a href="contact.html">click here</a>.
</body>
</html>
```

The NOM Bot would consider both of these links as links to potential contact pages because the hyperlink text in the first example is "contact us" and because the hyperlink URL in the second example is "contact.html". The NOM Bot looks for keywords within link text and URLs to assess whether the link might go to a page including contact information. An example of such a keyword is "contact".

In this example, the NOM Bot then creates one string of data based on the HTML on the homepage and the HTML found on the potential contact pages and stores this in memory. The NOM Bot parses this HTML using pattern matching and/or regular expressions to pick out contact information for each method it is programmed to look for.

For example, when looking for a telephone number, the NOM Bot looks for strings of numbers. The NOM Bot looks for 10 or 11 digits with or without spaces beginning 01, 02, 03, 07 or 08 and 11 or 12 digits with or without spaces prefixed with a "+" sign starting with 44 when looking for a number for a UK user. In some examples, the NOM Bot purposely ignores 09 numbers as these are premium numbers in the UK and potentially unhelpful. The NOM Bot may use different matching rules when finding numbers for other countries. The NOM Bot may ignore numbers prefixed with currency symbols or suffixed with weight measurements. An example telephone number the NOM Bot would, in this example, identify is in the following example HTML content:

```
<html>
<body>
You can call us on 0123 456 789.
</body>
</html>
```

An example of a number that the NOM Bot may not consider to be a telephone number is provided in the following example HTML content:

```
<html>
<body>
John Smith won $900000000 on the powerball lottery
</body>
</html>
```

In some examples, when looking for a social media contact identifier, for example an identifier associated with a Twitter™, Facebook™ or LinkedIn™ profile, the NOM Bot searches for "twitter.com/", "facebook.com/" or "linkedin.com/" within the HTML content and considers characters to the right of such text to be a contact identifier associated with a Twitter™, Facebook™ or LinkedIn™ profile until it encounters a terminating character. In some examples, the terminating character is a single or double quote but it may be another character such as a space. In some examples, the search is not case-sensitive. An example of HTML content in which the NOM Bot may be able to identify a social media contact identifier is:

```
<html>
<body>
Check out my <a href="http://www.facebook.com/johnsmimth">Facebook page</a>
</body>
</html>
```

Each contact method may have different pattern matching rules and new contact methods and rules may added to the NOM Bot.

If contact information is not stored in clear text, for example if it is displayed within an image or hidden through client-side JavaScript in some way, this information may not be retrievable by the NOM Bot.

Referring to FIG. 9, there is shown a flowchart illustrating an example of a method of processing data. In this example, the method is associated with a first example of a NOM Bot Lookup. In this example, the NOM Bot Lookup is in the form of a NOM Bot DNS query.

At 900, a domain name is identified. In this example, the domain name is "example.com".

At 901, a dot "." and the labels "bot", "nomserver" and "com" are added in the form ".bot.nomserver.com" to the end of the identified domain name "example.com" so that a lookup domain name "example.com.bot.nomserver.com" is obtained. In this example, the domain names "example.com", "bot.nomserver.com" and "example.com.bot.nomserver.com" are all resolvable domain names.

At 902, domain name resolution is performed using the obtained domain name "example.com.bot.nomserver.com".

A query as part of the domain resolution process may be made to a custom DNS server, hereinafter referred to as the "NOM Bot Server". In this example, the domain being queried is prefixed to the "bot.nomserver.com" domain name and the form of the query is as follows:
example.com.bot.nomserver.com. IN TXT At 903, the domain name "example.com.bot.nomserver.com" is resolved. In this example, the domain name "example.com.bot.nomserver.com" should resolve because a custom name server running at the domain name "bot.nomserver.com" will respond to a TXT resource record query for any subdomain of the domain name "bot.nomserver.com", of which "example.com.bot.nomserver.com" is an example.

At 904, it is determined whether the NOM Bot has a cached record for the domain name "example.com.bot.nomserver.com". All cached records are stored at the domain name "cache.bot.nomserver.com" so the NOM Bot makes a DNS request for the domain name "example.com.cache.bot.nomserver.com".

If the result of the determination at 904 is that the NOM Bot has a cached record for the domain name "example.com.bot.nomserver.com", then the cached record is returned.

If the result of the determination at 904 is that the NOM Bot does not have a cached record for the domain name "example.com.bot.nomserver.com", then, at 905, the NOM Bot is notified of the NOM Bot Lookup and makes an HTTP request to the domain name "example.com" on port 80. The NOM Bot downloads all of the HTML content on the home page and saves the downloaded HTML content to a "html_content" variable. The NOM Bot builds an array out of the internal links found on the homepage.

At 906, it is determined whether any of the links in the array look like they may lead to potential contact pages.

If the result of the determination at 906 is that some of the links in the array look like they may lead to potential contact pages, then, at 907, the NOM Bot makes an HTTP request for the potential contact pages, downloads the HTML content from those pages and appends the downloaded content to the "html_content" variable.

If the result of the determination at 906 is that none of the links in the array looks like it may lead to a potential contact page, or following the appending of the downloaded content from the potential contact pages if such pages were identified, at 908 the NOM Bot processes the content in the "html_content" variable using pattern matching and/or regular expressions to find contact information.

At 909, it is determined whether any contact information was found in the "html_content" variable.

If the result of the determination at 909 is that no contact information was found, then a predetermined action is taken at 910. In this example, the predetermined action is to return an error.

If the result of the determination at 909 is that no contact information was found, then, at 911, the contact information is stored as a NOM Record and is stored in a NOM Bot cache. The NOM Record is then returned at 912.

In this example, the response is of the following form:

example.com.bot.nomserver.com. 3600 IN TXT
"v=NOM1|t=r|n=Example Company Ltd|tel=General:0123456789|tel=Support:0123498765|fb=nomfb|tw=nomtwitter|."

In this example, the response comprises the domain name "example.com.bot.nomserver.com". The label "bot" in this domain name indicates that the response comprises data generated using the NOM Record. The label "bot" is therefore data indicative that the NOM Record has been generated using an automated contact information parsing technique.

In this example, items 901, 902 and 904 are performed by the NOM Interrogator on the user device. In this example, item 903 is performed by the DNS. In this example, items 905-912 are performed by the NOM Bot Server.

The NOM Bot DNS Query technique allows queries to be cached at two levels. Queries can firstly be cached as part of the wider DNS system. Queries can secondly be cached within the NOM Bot cache. These are DNS zones stored in the domain name "cache.bot.nomserver.com". In addition to an Independent NOM Domain Name Lookup and a Hosted NOM Domain Name Lookup, performing a NOM Bot Lookup using this technique would require one additional DNS query.

Referring to FIG. 10, there is shown a flowchart illustrating an example of a method of processing data. In this example, the method is associated with a NOM Bot Lookup in the form of an Application Programming Interface (API) Call.

At 1000, a domain name is identified. In this example, the domain name is "example.com".

At 1001, an API call is made using JavaScript Object Notation (JSON). An API provides a way for applications, in this example the NOM Interrogator, to communicate with other applications, in this example the NOM Bot Server, using a defined set of commands. In this example, the API comprises of a set of HTTP request messages, along with a definition of the structure of response messages. In this example, information is sent and received in JSON format. An example of an API call that may be made is:

GET http://bot.nomserver.com/lookup?domain=nomexample.com

At 1002, the NOM Bot makes an HTTP request to the domain name "example.com" on port 80. The NOM Bot downloads all of the HTML content on the home page and saves the HTML content to a variable "html_content". The NOM Bot builds an array out of the internal links found on the homepage.

At 1003, it is determined whether any of the links in the array look like they may lead to potential contact pages.

If the result of the determination at 1003 is that the some of the links in the array look like they may lead to potential contact pages, then, at 1004, the NOM Bot makes an HTTP request to the potential contact pages, downloads the HTML content from those pages and appends the downloaded content to the "html_content" variable.

If the result of the determination at 1003 is that none of the links in the array looks like a potential contact page, or following the appending of the downloaded content from the potential contact pages if such pages were identified, at 1005 the NOM Bot processes the content in the "html_content" variable using pattern matching and regular expressions to find contact information.

At 1006, it is determined whether any contact information was found in the "html_content" variable.

If the result of the determination at 1006 is that no contact information was found, then a predetermined action is taken at 1007. In this example, the predetermined action is to return an error.

If the result of the determination at 1006 is that no contact information was found, then, at 1008, the contact information is stored as a NOM Record and is stored in the NOM Bot cache. The NOM Record is then returned at 1009.

In this example, an example response from the NOM Bot Server may have the following form and content:

```
HTTP/1.1 200 OK
Content-Type: application/json
{
  "data": [
  "domain": "nomexample.com",
  "t": "r",
  "n": "Example Company Ltd",
  "tel": "0123456789",
  "fb": "nomfb",
  "tw": "nomtwitter"]
}
```

In this example, items 1000 and 1001 are performed by the Interrogator on the user device. In this example, items 1002-1009 are performed by the NOM Bot Server.

Referring to FIG. 11, there is shown a flowchart illustrating an example of a method of processing data. In this example, the method is associated with a NOM Bot Lookup in the form of a Client-Side NOM Bot Lookup.

At 1100, a domain name is identified. In this example, the domain name is "example.com".

At 1101, the NOM Interrogator initiates client-side HTML downloading and parsing.

At 1102, the NOM Interrogator makes an HTTP request to the domain name "example.com" on port 80. The NOM Interrogator downloads all of the HTML content on the home page and saves the HTML content to a variable "html_content". The NOM Interrogator builds an array out of the internal links found on the homepage.

At 1103, it is determined whether any of the links in the array look like they may lead to potential contact pages.

If the result of the determination at 1103 is that the some of the links in the array look like they may lead to potential contact pages, then, at 1104, the NOM Interrogator makes an HTTP request to the potential contact pages, downloads the HTML content from those pages and appends the downloaded content to the "html_content" variable.

If the result of the determination at 1103 is that none of the links in the array look like a potential contact page, or following the appending of the downloaded content from the potential contact pages if such pages were identified, at 1105 the NOM Interrogator processes the content in the "html_content" variable using pattern matching and/or regular expressions to find contact information.

At 1106, it is determined whether any contact information was found in the "html_content" variable.

If the result of the determination at 1106 is that no contact information was found, then a predetermined action is taken at 1107. In this example, the predetermined action is to return an error.

If the result of the determination at 1106 is that contact information was found, then, at 1108, the contact information is formatted as a NOM Record. The NOM Record is then returned at 1109.

At 1110, the NOM Record is stored in the NOM Bot cache.

In some examples, NOM Record data from user devices would only be trusted when the same data had been gathered by a predetermined number of, for example 20, independent users.

Figure 12:
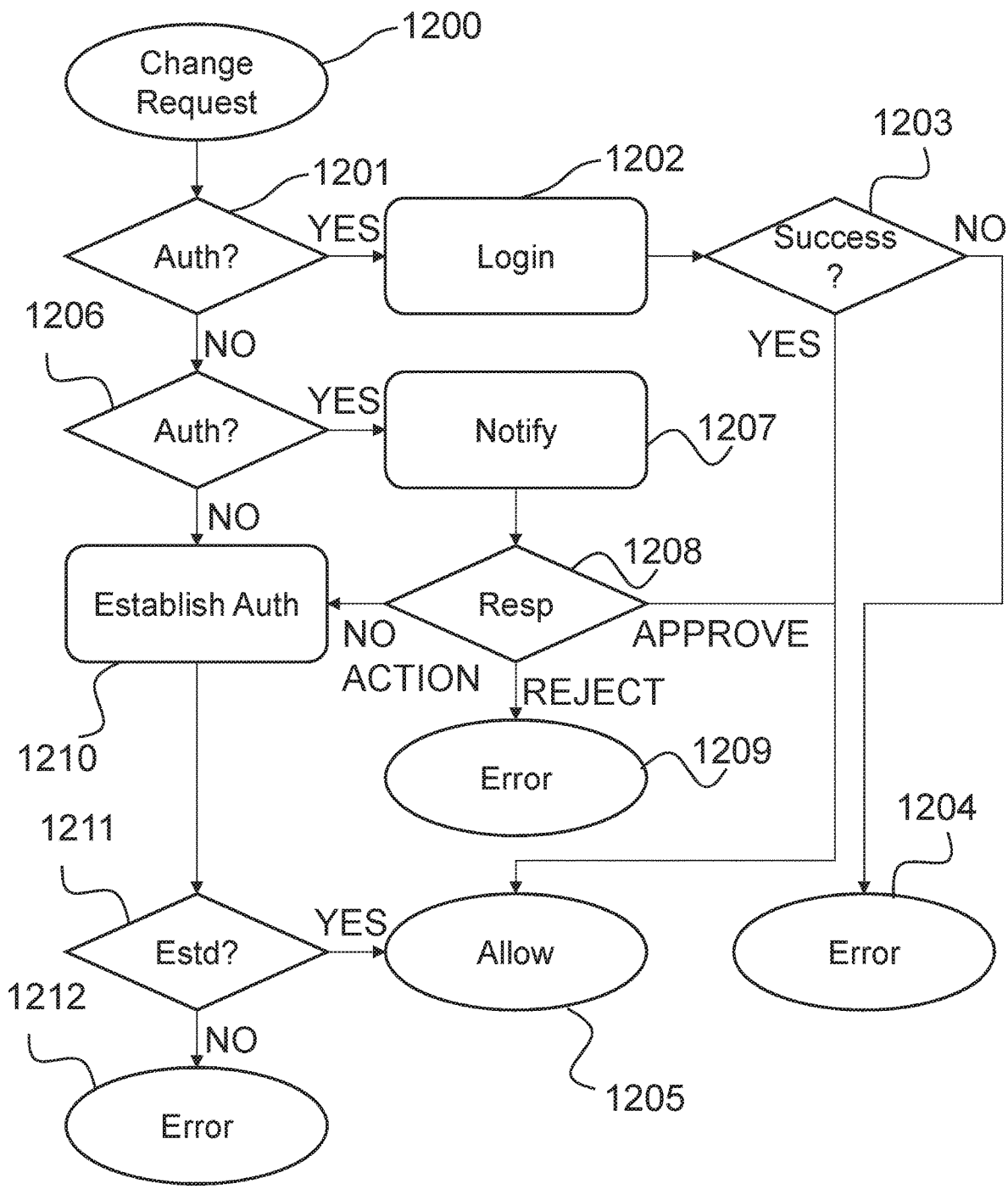
FIG. 12 shows a flowchart illustrating schematically an example of a method in accordance with an embodiment of the present invention.

Referring to FIG. 12, there is shown a flowchart of an example of a method of processing data. In this example, the method is associated with adding and editing NOM Records on the NOM Server.

In this example, a web interface is provided for domain administrators to add a new Hosted NOM Record or modify their existing Hosted NOM Record. When editing the Hosted NOM Record, they may add new contact methods as well as edit or delete existing methods. In some examples, the Hosted NOM Record is edited and published automatically to include the new contact information.

In some examples, a server is configured to perform at least part of an automated authentication process to allow some or all of the contact information in the one or more resource records associated with the domain to be modified. Performing at least part of the automated authentication process may involve receiving login details via an administrator web application and checking the received login details against details stored in a record.

Pre-registered domain administrators are asked to authenticate by providing a username and password to log-in to a web interface of the NOM Server to make changes. In some examples, domain administrators that have not already registered are asked to prove authority by accepting an automated call on a telephone number shown on the homepage or contact page of the website hosted on the domain they are attempting to administer. They are asked to enter a security code provided to the receiver of the call into the web page provided. In some examples, domain administrators can also prove authority by adding an HTML comment including a random string to their homepage.

At 1200, a requesting domain administrator requests changes to a NOM Record for a domain name.

At 1201, it is determined whether the requesting domain administrator is already authenticated for the domain.

If the determination at 1201 is that the requesting domain administrator is already authenticated for the domain, then, at 1202, a username and password are requested.

At 1203, it is determined whether the username and password are correct.

If the determination at 1203 is that the username and password are not correct, then a predetermined action is taken at 1204. In this example, the predetermined action is an error message. An example of an error message is "Login Failed".

If the determination at 1203 is that the username and password are correct, then at 1205, changes to the NOM Record are allowed.

If the determination at 1201 is that the requesting domain administrator is not already authenticated for the domain, then, at 1206, it is determined whether any domain administrator has already been authenticated for the domain.

If it is determined at 1206 that a domain administrator has already authenticated for the domain, then at 1207 the domain administrator already authenticated for the domain is notified.

At 1208, it is determined whether the domain administrator already authenticated for the domain has approved or rejected the request within a given time period. In this example the given time period is 72 hours.

If it is determined at 1208 that the domain administrator already authenticated for the domain has approved the request, then the changes to the NOM Record are allowed at 1205.

If it is determined at 1208 that the domain administrator already authenticated for the domain has rejected the request, then a predetermined action is taken at 1209. In this example, the predetermined action comprises displaying an error message. For example, the error message may be "Authorisation Rejected".

If it is determined at 1208 that the domain administrator already authenticated for the domain has not taken any action within the 72-hour period, then, at 1210 the requesting domain administrator is requested to establish their authority over the domain.

Similarly, if it is determined at 1206 that no domain administrator has already authenticated for the domain, then, at 1210, the requesting domain administrator is requested to establish their authority over the domain.

At 1211, it is determined whether the requesting domain administrator has established authority over the domain.

If it is determined at 1211 that the new domain administrator has established authority over the domain, then the changes to the NOM Record are allowed at 1205.

If it is determined at 1211 that the requesting domain administrator has not established authority over the domain, then a predetermined action is taken. In example, the predetermined action is to display an error message. For example, a message "Authorisation Failed".

In examples described below, the NOM Framework can also be used to search for brands and/or keywords by converting a brand and/or keyword into a domain name as an initial procedure. In the examples described below, an example company name of "Smith & Sons" is used. In these examples, Smith & Sons operate the website "smithandsons.co.uk" and provide double-glazed windows throughout the UK.

It is possible to run a brand search in two different ways. The NOM Interrogator can run the search within the NOM Framework or the NOM Interrogator can convert the brand to a domain itself.

Figure 13:
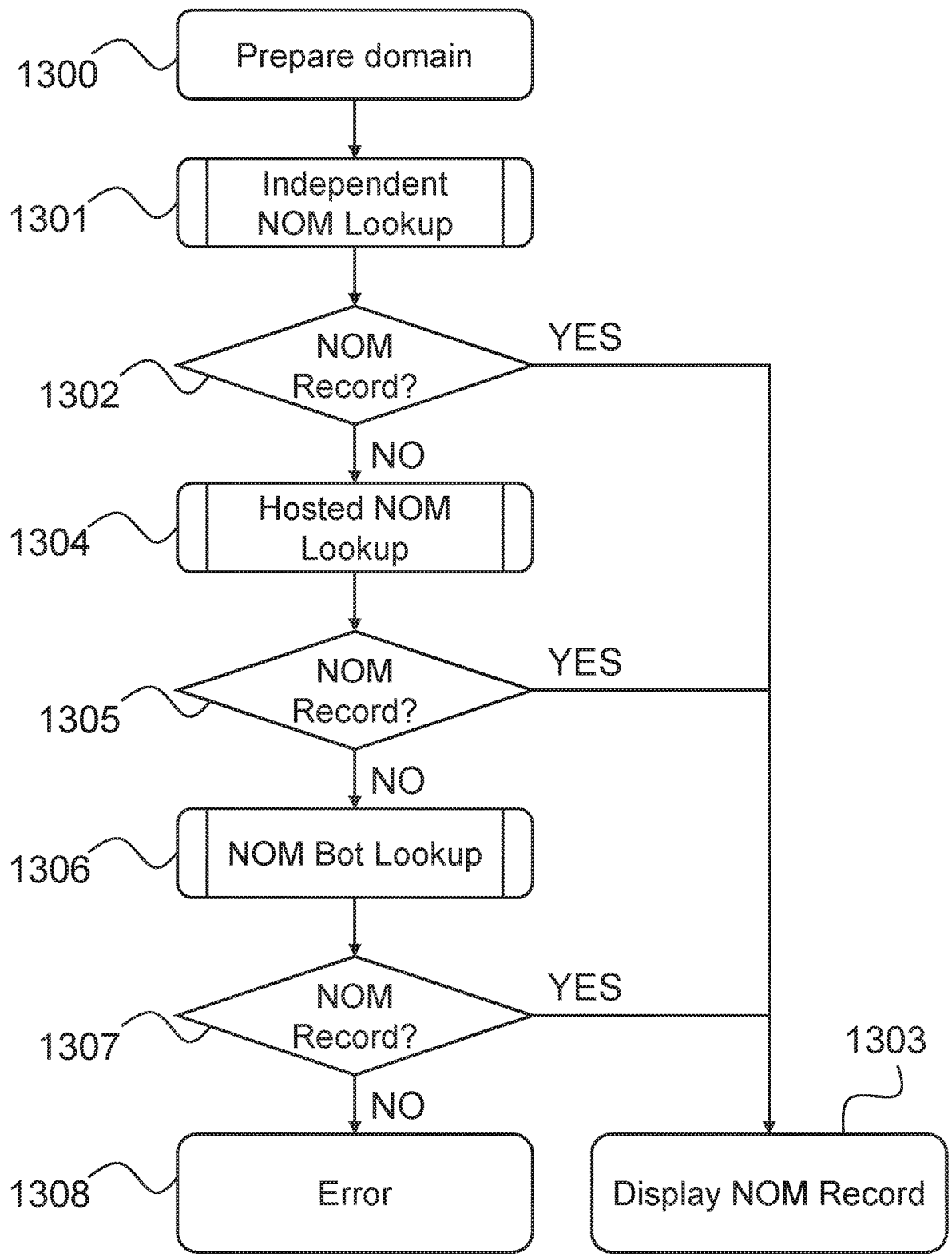
FIG. 13 shows a flowchart illustrating schematically an example of a method in accordance with an embodiment of the present invention.

Referring to FIG. 13, there is shown a flowchart of an example of a method of processing data. In this example, the method is associated with a brand search within the NOM Framework. In this example, a user is able to search using the term "Smith & Sons" instead of "smithandsons.co.uk".

At 1300, at least one data string is identified. In this example, a data string "Smith & Sons" is identified. In this example, the data string is associated with a brand. A lookup domain name is prepared. In this example, one or more lookup domain name rules are used to prepare the lookup domain name. In this example, spaces in the data string are replaced with hyphens. In this example, the ampersand character "&" is replaced with the word "and".

In this example, a "record_number" variable is initially set to a value of "1" if it is currently blank. In this example, the lookup domain name is prefixed with "<<record_number>>", which is the current value of the "record_number" variable. In this example, the current value of the "record_number" variable is "1".

In this example, the domain name "brand.<<user_country>>.nomquery.com" is added at the end of the lookup domain name. The domain name "brand.<<user_country>>.nomquery.com" includes four labels, namely "brand", "<<user_country>>", "nomquery" and "com". The "user_country" variable indicates a country associated with the user, for example a country in which the user is currently located. <<user_country>> indicates the current value of the "user_country" variable. In this example, the user is currently in the UK and so the current value of the "user_country" variable is "uk".

In this example, the prepared domain name is "1.smith-and-sons.uk.brand.nomquery.com".

At 1301, an Independent NOM Domain Name Lookup is performed. The lookup domain name used for the Independent NOM Domain Name Lookup would be "nomrecordlookup.1.smith-and-sons.uk.brand.nomquery.com".

At 1302, it is determined whether the Independent NOM Domain Name Lookup performed at 1301 resulted in a NOM Record being returned.

If the result of the determination at 1302 is that a NOM Record is returned, then the NOM Record is displayed at 1303.

If the result of the determination at 1302 is that a NOM Record is not returned, then a Hosted NOM Domain Name Lookup is performed at 1304. The lookup domain name used for the Hosted NOM Domain Name Lookup would be "1.smith-and-sons.uk.brand.nomquery.com.lookup.nomserver.com".

In this example, the domain name used for the Hosted NOM Domain Name Lookup "1.smith-and-sons.uk.brand.nomquery.com.lookup.nomserver.com" includes the prepared domain name "1.smith-and-sons.uk.brand.nomquery.com". In this example, the authoritative name server for the domain name "1.smith-and-sons.uk.brand.nomquery.com.lookup.nomserver.com" may also be the authoritative name server for the domain name "1.smith-and-sons.uk.brand.nomquery.com".

At 1305, it is determined whether the Hosted NOM Domain Name Lookup performed at 1304 resulted in a NOM Record being returned.

If the result of the determination at 1305 is that a NOM Record is returned, then the NOM Record is displayed at 1303.

If the result of the determination at 1305 is that a NOM Record is not returned, then a NOM Bot Lookup is performed at 1306.

At 1307, it is determined whether the NOM Bot Lookup performed at 1306 resulted in a NOM Record being returned.

If the result of the determination at 1307 is that a NOM Record is returned, then the NOM Record is displayed at 1303.

If the result of the determination at 1307 is that a NOM Record is not returned, then a predetermined action is taken. In this example, the predetermined action involves an error message being returned and displayed. For example the message "No NOM Record found for this brand" may be displayed.

In this example, items 1300, 1302, 1303, 1305, 1307 and 1308 are performed by the NOM Interrogator. In this example, items 1301, 1304 and 1306 involve at least one other apparatus than the user device on which the NOM Interrogator is located.

In the example described above with reference to FIG. 13, the following domains are queried "nomrecordlookup.1.smith-and-sons.brand.uk.nomquery.com" (independent) and "1.smith-and-sons.brand.uk.nomquery.com.lookup.nomserver.com" (hosted, as a backup). These domain names may be created within the NOM Framework and include NOM Records for the domains that match the brand. The NOM Records may be copied from the relevant domain name listed as a match for the search, in this example "smithandsons.co.uk". The example described above with reference to FIG. 13 is dependent on the NOM infrastructure. Another technique may be used which runs more independently of the NOM Framework, where the brand is converted into a resolvable domain name on the NOM Interrogator itself, as will now be described with reference to FIGS. 14A and 14B.

Figure 14A:
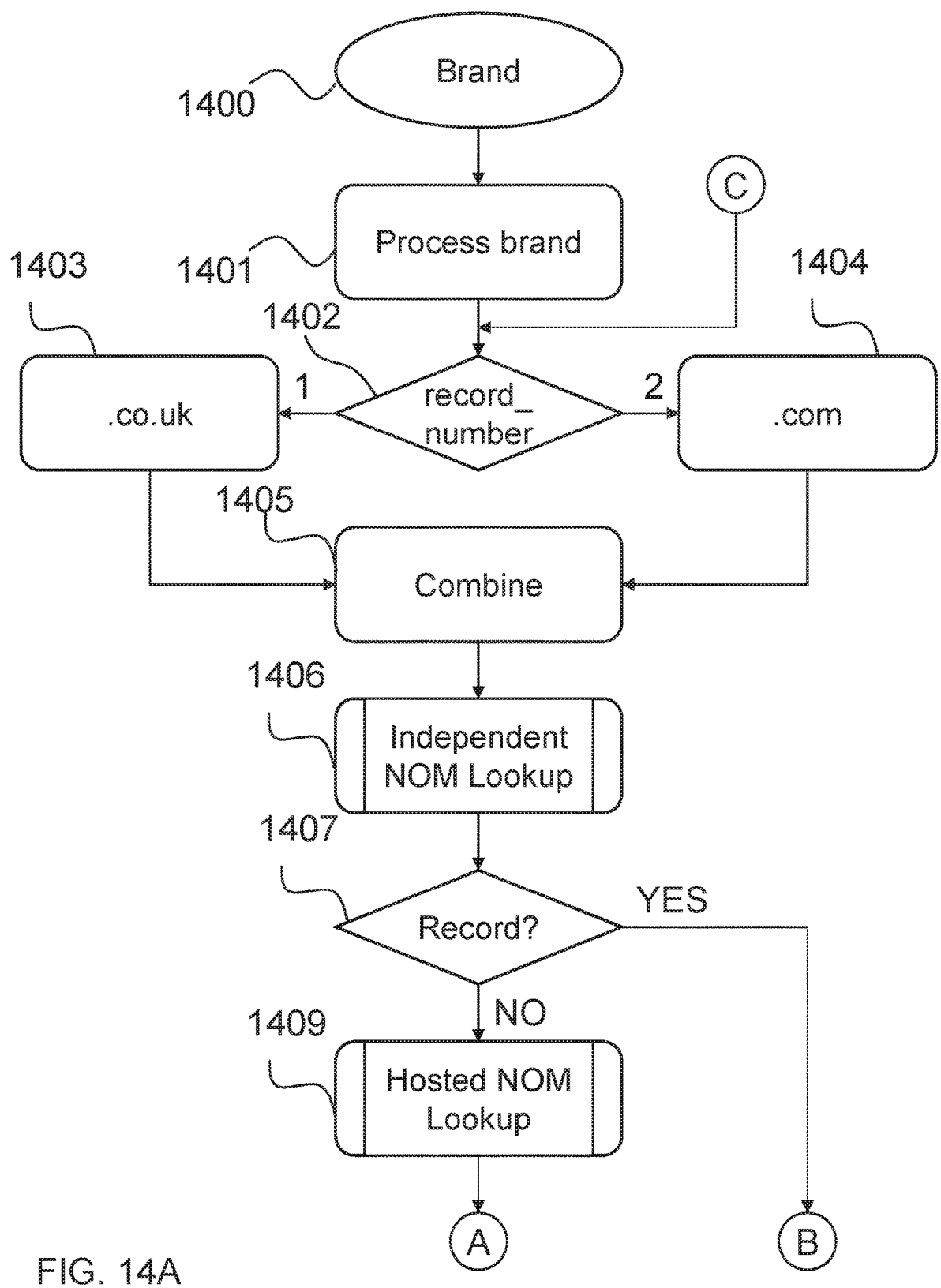
FIGS. 14A and 14B show a flowchart illustrating schematically an example of a method in accordance with an embodiment of the present invention.
Figure 14B:
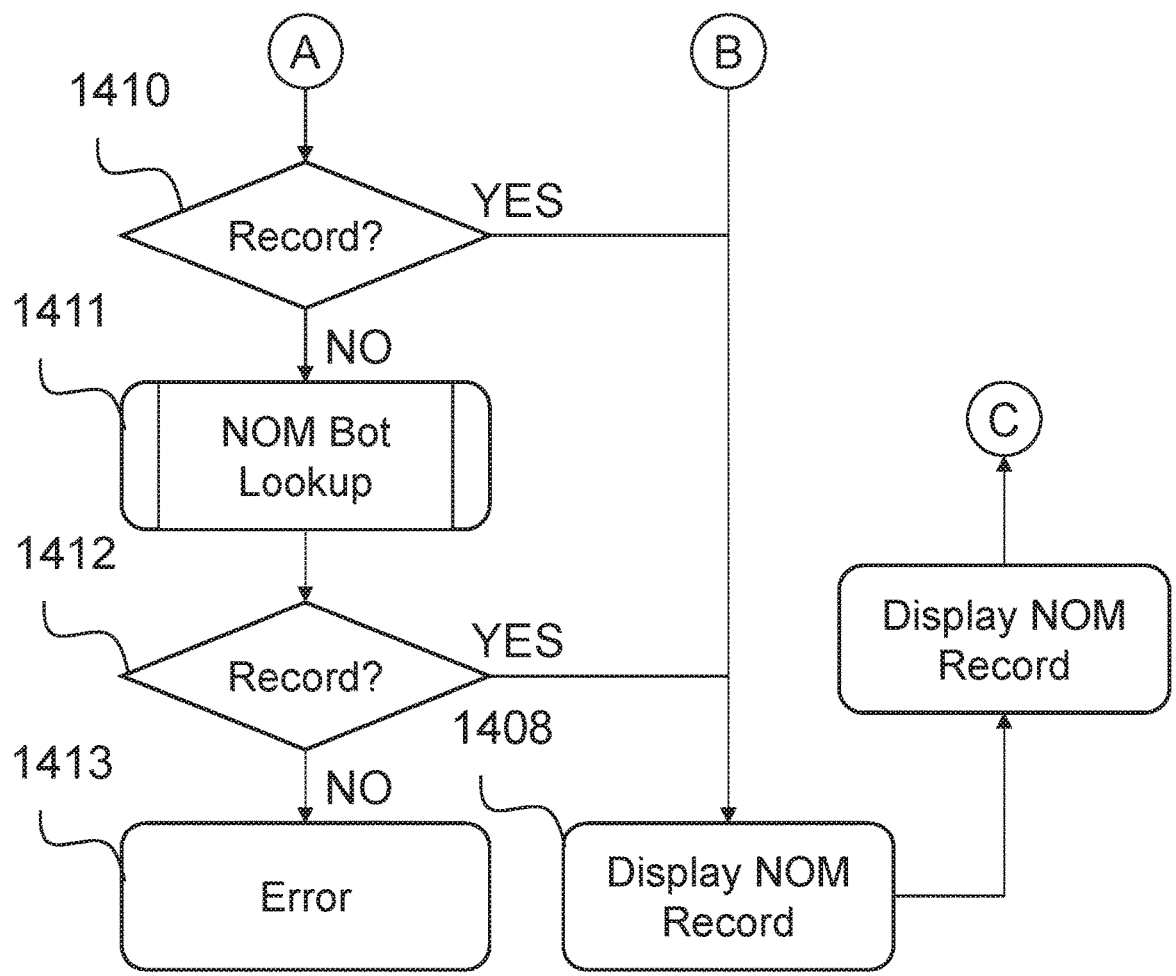

Referring to FIGS. 14A and 14B, there is shown a flowchart of an example of a method of processing data. In this example the method is associated with a Brand To Domain Conversion procedure. The NOM Interrogator may use the Brand To Domain Conversion procedure to convert a brand into a domain name.

At 1400, at least one data string is identified. In this example, a data string "Smith & Sons" is identified. In this example, the data string is associated with a brand.

At 1401, any spaces are removed from the data string and any ampersand characters "&" are replaced with the word "and". In this example, the data string "Smith & Sons" is processed in this way to produce the data string "smithandsons". In this example, the data string "smithandsons" is saved in a "brand_domain" variable.

At 1402, a value of a variable "record_number" is determined.

If it is determined at 1402 that the value of the variable "record_number" is "1", then at 1403 the primary country domain is obtained based on the current value of the <<user_country>> variable. For example, where the current value of the <<user_country>> variable is "UK", the primary country domain may be "co.uk". The primary country domain is saved as a "brand_domain_extension" variable.

If it is determined at 1402 that the value of the variable "record_number" is "2", then at 1404 the "brand_domain_extension" variable is set as ".com".

At 1405, the values of the "brand_domain" and "brand_domain_extension" variables are combined. This may, for example, result in the domain names "smithandsons.co.uk" and "smithandsons.com" being obtained. In this example, "smithandsons.co.uk" and "smithandsons.com" are domains resulting from the NOM Brand To Domain Conversation procedure.

At 1406, an Independent NOM Domain Name Lookup is performed. In this example, the lookup domain names used for the Independent NOM Domain Name Lookup are "nomrecordlookup.smithandsons.co.uk" and "nomrecordlookup.smithandsons.com". In this example, an Independent NOM Domain Name Lookup is performed for one of these domain names at a time, based on the current value of the "record_number" variable. For example, when the value of the "record_number" is "1", the domain name "nomrecordlookup.smithandsons.co.uk" is used and when the value of the "record_number" is "2", the domain name "nomrecordlookup.smithandsons.com" is used. In other examples, Independent NOM Domain Name Lookups for both "nomrecordlookup.smithandsons.co.uk" and "nomrecordlookup.smithandsons.com" are performed in parallel.

At 1407, it is determined whether the Independent NOM Domain Name Lookup performed at 1406 resulted in a NOM Record being returned.

If the result of the determination at 1407 is that a NOM Record is returned, then the NOM Record is displayed at 1408.

If the result of the determination at 1407 is that a NOM Record is not returned, then a Hosted NOM Domain Name Lookup is performed at 1409. In this example, the lookup domain names used for the Hosted NOM Domain Name Lookup are "smithandsons.co.uk.lookup.nomserver.com" and "smithandsons.com. lookup.nomserver.com".

In this example, the domain names used for the Hosted NOM Domain Name Lookup, "smithandsons.co.uk.lookup.nomserver.com" and "smithandsons.com. lookup.nomserver.com" include the domain names "smithandsons.co.uk" and "smithandsons.com" respectively. In this example, the authoritative name server for the domain name "smithandsons.co.uk.lookup.nomserver.com" is different from the authoritative name server for the domain name "smithandsons.co.uk" and the authoritative name server for the domain name "smithandsons.com.lookup.nomserver.com" is different from the authoritative name server for the domain name "smithandsons.com".

At 1410, it is determined whether the Hosted NOM Domain Name Lookup performed at 1409 resulted in a NOM Record being returned.

If the result of the determination at 1410 is that a NOM Record is returned, then the NOM Record is displayed at 1408.

If the result of the determination at 1410 is that a NOM Record is not returned, then a NOM Bot Lookup is performed at 1411.

At 1412, it is determined whether the NOM Bot Lookup performed at 1410 resulted in a NOM Record being returned.

If the result of the determination at 1412 is that a NOM Record is returned, then the NOM Record is displayed at 1408. A user can use a Record Navigator on the user device to navigate through the returned NOM Records. As the user navigates between the first and second NOM Records, the "record_number" variable is incremented by "1" at 1413 so that the desired NOM Record is displayed.

If the result of the determination at 1412 is that a NOM Record is not returned, then a predetermined action is taken. In this example, the predetermined action involves an error message being returned and displayed. For example the message "No NOM Record found for this domain name" may be displayed.

Figure 15:
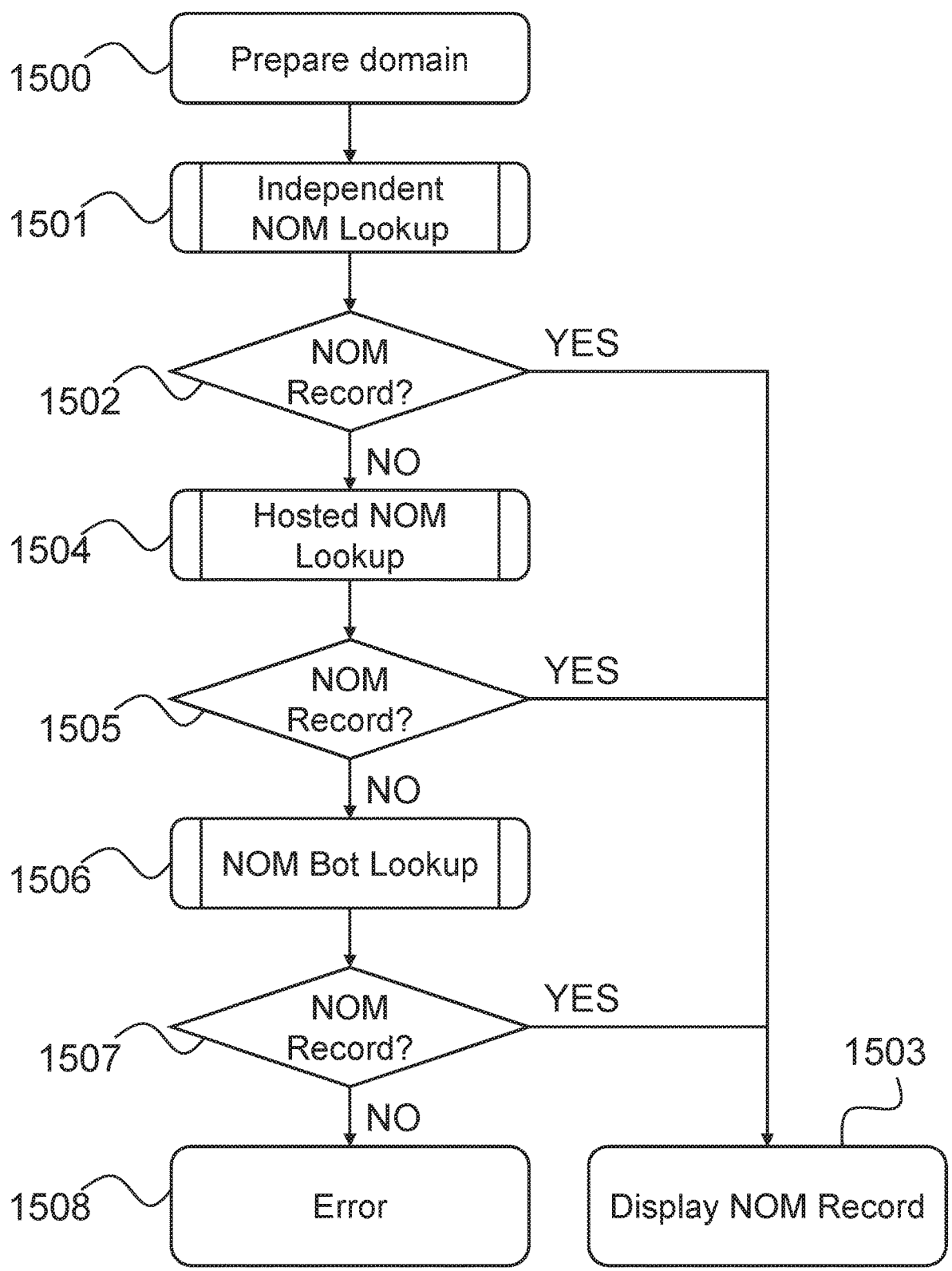
FIG. 15 shows a flowchart illustrating schematically an example of a method in accordance with an embodiment of the present invention.

Referring to FIG. 15, there is shown a flowchart of a method of processing data. In this example, the method is associated with a keyword search. In this example, the user is able to perform a keyword search using the string "Double Glazing". In this example, there is only one way to perform a keyword search, namely within the NOM Framework, since there is no reliable way for the NOM Interrogator to convert a keyword into a domain name. Businesses may be allowed to list their domain name under keywords.

At 1500, at least one data string is identified. In this example, a data string "Double Glazing" is identified. In this example, the data string is associated with one or more keywords. A lookup domain name is prepared. In this example, one or more lookup domain name rules are used to prepare the lookup domain name. In this example, any spaces in the data string are replaced with hyphens. In this example, any ampersand characters "&" in the data string are replaced with the word "and".

In this example, a "record_number" variable is initially set to a value of "1" if it is currently blank. In this example, the lookup domain name is prefixed with "<<record_number>>", which is the current value of the "record_number" variable. In this example, the current value of the "record_number" variable is "1".

In this example, the domain name "keyword.<<user_country>>.nomquery.com" is added at the end of the prepared domain name. The domain name "keyword.<<user_country>>.nomquery.com" includes four labels, namely "keyword", "<<user_country>>", "nomquery" and "com". The "user_country" variable indicates a country associated with the user, for example a country in which the user is currently located. <<user_country>> indicates the current value of the "user_country" variable. In this example, the user is currently in the UK and so the current value of the "user_country" variable is "uk".

In this example, the prepared domain name is "1.double-glazing.uk.keyword.nomquery.com".

At 1501, an Independent NOM Domain Name Lookup is performed. In this example, the lookup domain name for the Independent NOM Doman Name Lookup is "nomrecordlookup.1.double-glazing.uk.keyword.nomquery.com".

At 1502, it is determined whether the Independent NOM Domain Name Lookup performed at 1501 resulted in a NOM Record being returned.

If the result of the determination at 1502 is that a NOM Record is returned, then the NOM Record is displayed at 1503.

If the result of the determination at 1502 is that a NOM Record is not returned, then a Hosted NOM Domain Name Lookup is performed at 1504. In this example, the lookup domain name for the Hosted NOM Domain Name Lookup is "1.double-glazing.uk.keyword.nomquery.com.lookup.nomserver.com".

In this example, the domain name used for the Hosted NOM Domain Name Lookup "1.double-glazing.uk.keyword.nomquery.com.lookup.nomserver.com" includes the prepared domain name "1.double-glazing.uk.keyword.nomquery.com". In this example, the authoritative name server for the domain name "1.double-glazing.uk.keyword.nomquery.com.lookup.nomserver.com" may also be the authoritative name server for the domain name "1.double-glazing.uk.keyword.nomquery.com".

At 1505, it is determined whether the Hosted NOM Domain Name Lookup performed at 1504 resulted in a NOM Record being returned.

If the result of the determination at 1505 is that a NOM Record is returned, then the NOM Record is displayed at 1503.

If the result of the determination at 1505 is that a NOM Record is not returned, then a NOM Bot Lookup is performed at 1506.

At 1507, it is determined whether the NOM Bot Lookup performed at 1506 resulted in a NOM Record being returned.

If the result of the determination at 1507 is that a NOM Record is returned, then the NOM Record is displayed at 1503.

If the result of the determination at 1507 is that a NOM Record is not returned, then a predetermined action is taken. In this example, the predetermined action involves an error message being returned and displayed. For example the message "No NOM Record found for this keyword" may be displayed.

In this example, items 1500, 1502, 1503, 1505, 1507 and 1508 are performed by the NOM Interrogator. In this example, items 1501, 1504 and 1506 involve at least one other apparatus than the user device on which the NOM Interrogator is located.

In the example above, the following domains are queried "nomrecordlookup.1.double-glazing.keyword.uk.nomquery.com" (independent) and "1.double-glazing.keyword.uk.nomquery.com.lookup.nomserver.com" (hosted, as a backup). These domains include NOM Records for the domains that match this keyword. These NOM Records may be copied from the relevant domain listed as a match for the search, in this example "smithandsons.co.uk".

If it is unclear to the NOM Interrogator whether the search query entered by the user is a keyword or brand the NOM Interrogator can run a 'string' search. This is a combined brand and keyword search and works in the same way the brand and keyword searches described above, except it queries using the domain name "<<record_number>>.<<search_text>>.string.<<country>>.nomquery.com". Such a domain name includes six labels, namely "<<record_number>>", "<<search_text>>", "string", "<<country>>", "nomquery" and "com". In this example, <<search_text>> is a placeholder for the text entered by the user into the user device.

Figure 16:
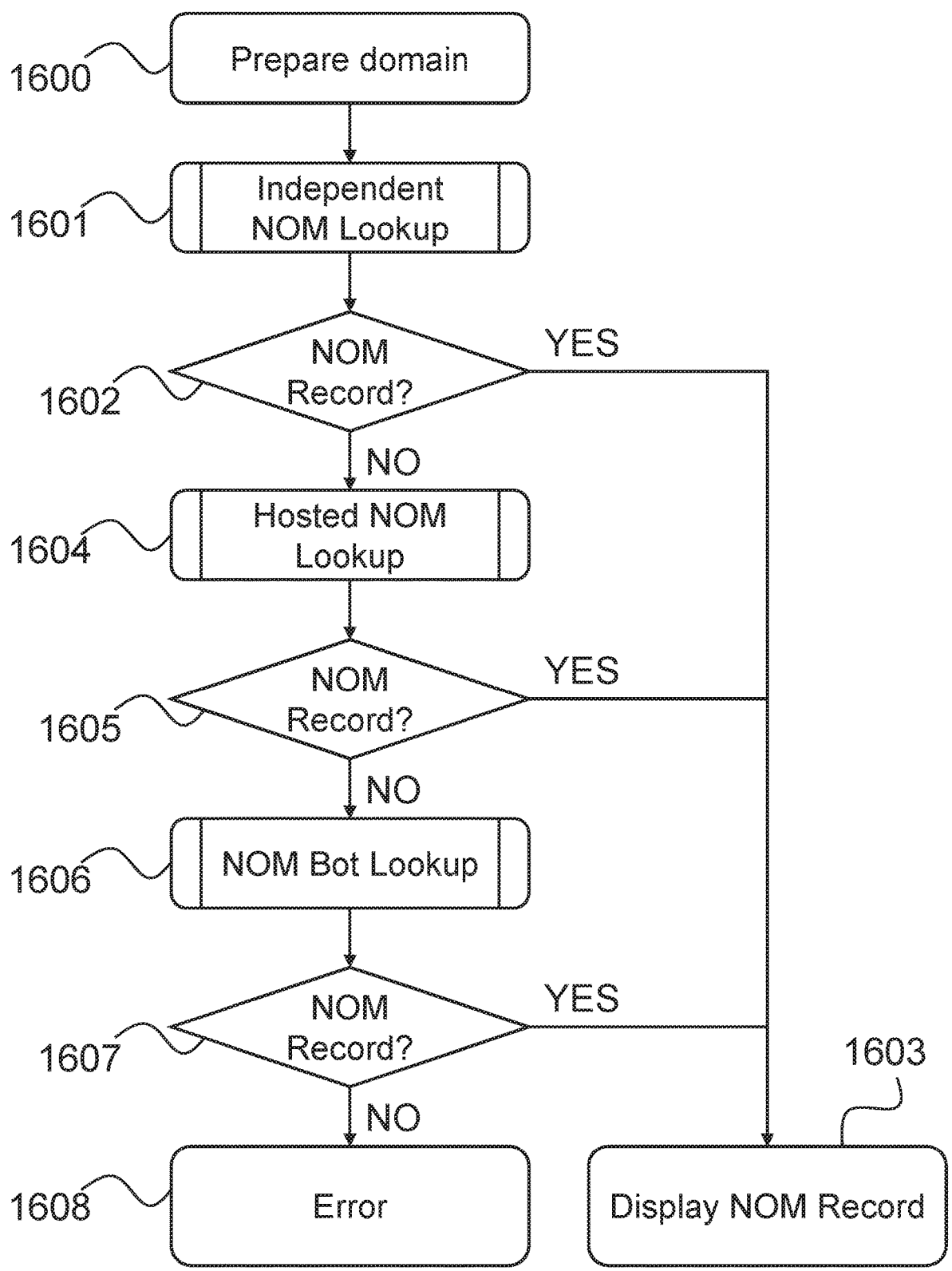
FIG. 16 shows a flowchart illustrating schematically an example of a method in accordance with an embodiment of the present invention.

Referring to FIG. 16, there is shown a flowchart of a method of processing data. In this example, the method is associated with a method and keyword search. With a method and keyword search a user is able to search for a contact method and keyword, for example "Facebook™" and "Double Glazing" to indicate that they only want NOM Records from businesses that offer double glazing and can be contacted via Facebook.

At 1600, at least one data string is identified. In this example, a first data string "fb" is identified. In this example, "fb" represents Facebook™. In this example, the string "fb" is associated with a "method" variable, which relates to the way or ways in which a user would like to contact another entity. As such, in this example, the user indicates they would like to contact another entity using Facebook™.

In this example, a second data string "Double Glazing" is identified. In this example, the string "fb" is associated with a "keyword" variable.

At 1601, a lookup domain name is prepared. In this example, one or more lookup domain name rules are used to prepare the lookup domain name. In this example, any spaces in the keyword data string are replaced with hyphens. In this example, any ampersand characters "&" in the keyword data string are replaced with the word "and". In this example a string "<<keyword>>.<<method>>" is obtained.

In this example, a "record_number" variable is initially set to a value of "1" if it is currently blank. In this example, the lookup domain name is prefixed with "<<record_number>>", which is the current value of the "record_number" variable. In this example, the current value of the "record_number" variable is "1".

In this example, the domain name "method-kw.<<user_country>>.nomquery.com" is added at the end of the prepared domain name. The domain name "method-kw.<<user_country>>.nomquery.com" includes four labels, namely "method-kw", "<<user_country>>", "nomquery" and "com". The "user_country" variable indicates a country associated with the user, for example a country in which the user is currently located. <<user_country>> indicates the current value of the "user_country" variable. In this example, the user is currently in the UK and so the current value of the "user_country" variable is "uk".

In this example, the prepared domain name is "1.double-glazinglb.uk.method-kw.nomquery.com".

At 1601, an Independent NOM Domain Name Lookup is performed. In this example, the lookup domain name for the Independent NOM Domain Name Lookup is "nomrecordlookup.1.double-glazing.fb.uk.method-kw.nomquery.com".

At 1602, it is determined whether the Independent NOM Domain Name Lookup performed at 1601 resulted in a NOM Record being returned.

If the result of the determination at 1602 is that a NOM Record is returned, then the NOM Record is displayed at 1603.

If the result of the determination at 1602 is that a NOM Record is not returned, then a Hosted NOM Domain Name Lookup is performed at 1604. In this example, the lookup domain name used for the Hosted NOM Domain Name Lookup is "1.double-glazing.fb.uk.method-kw.nomquery-.com.lookup.nomserver.com"

At 1605, it is determined whether the Hosted NOM Domain Name Lookup performed at 1604 resulted in a NOM Record being returned.

If the result of the determination at 1605 is that a NOM Record is returned, then the NOM Record is displayed at 1603.

If the result of the determination at 1605 is that a NOM Record is not returned, then a NOM Bot Lookup is performed at 1606.

At 1607, it is determined whether the NOM Bot Lookup performed at 1606 resulted in a NOM Record being returned.

If the result of the determination at 1607 is that a NOM Record is returned, then the NOM Record is displayed at 1603.

If the result of the determination at 1607 is that a NOM Record is not returned, then a predetermined action is taken. In this example, the predetermined action involves an error message being returned and displayed. For example the message "No NOM Record found for this method+keyword" may be displayed.

In this example, items 1600, 1602, 1603, 1605, 1607 and 1608 are performed by the NOM Interrogator. In this example, items 1601, 1604 and 1606 involve at least one other apparatus than the user device on which the NOM Interrogator is located.

Figure 17A:
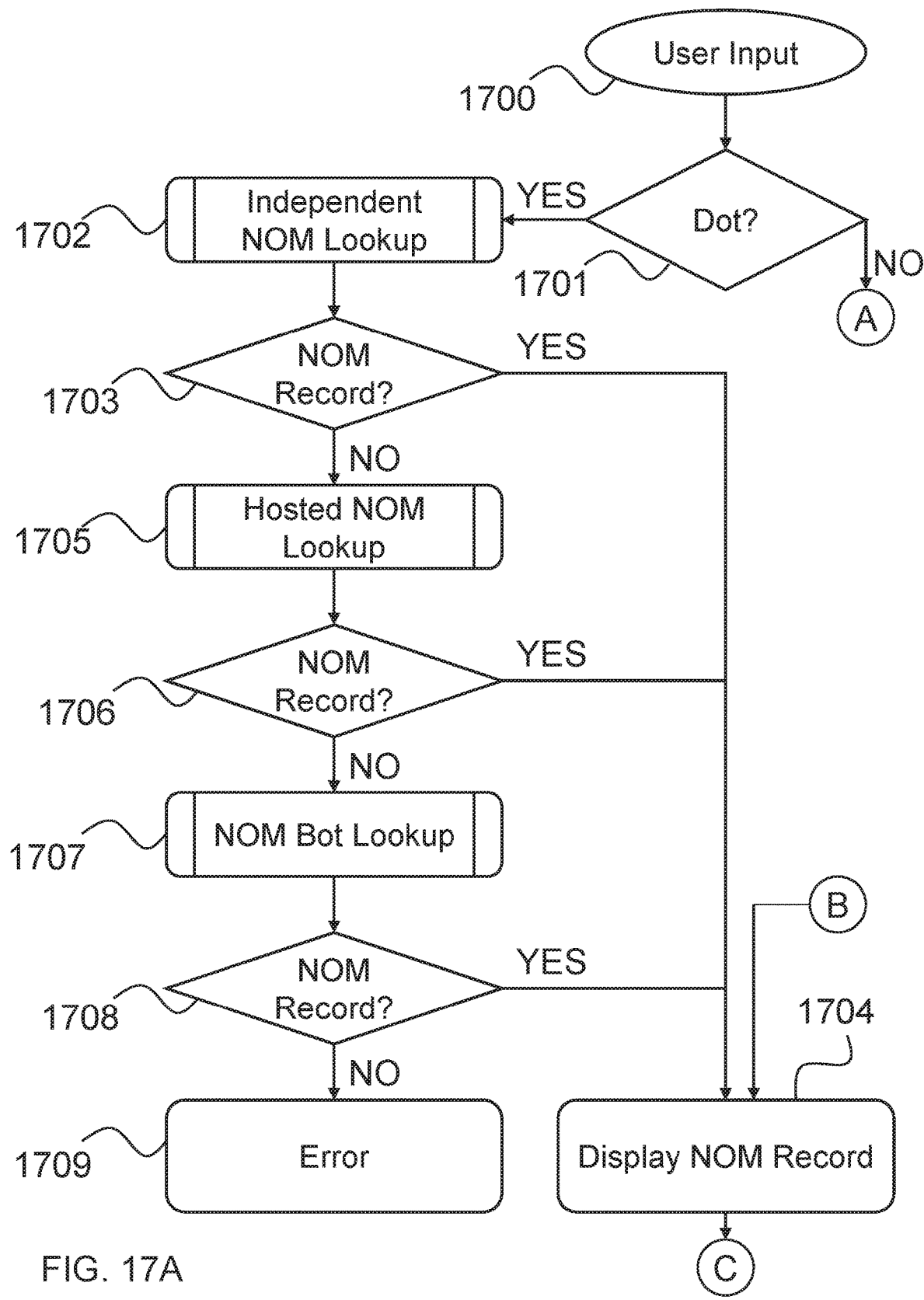
FIGS. 17A and 17B show a flowchart illustrating schematically an example of a method in accordance with an embodiment of the present invention.
Figure 17B:
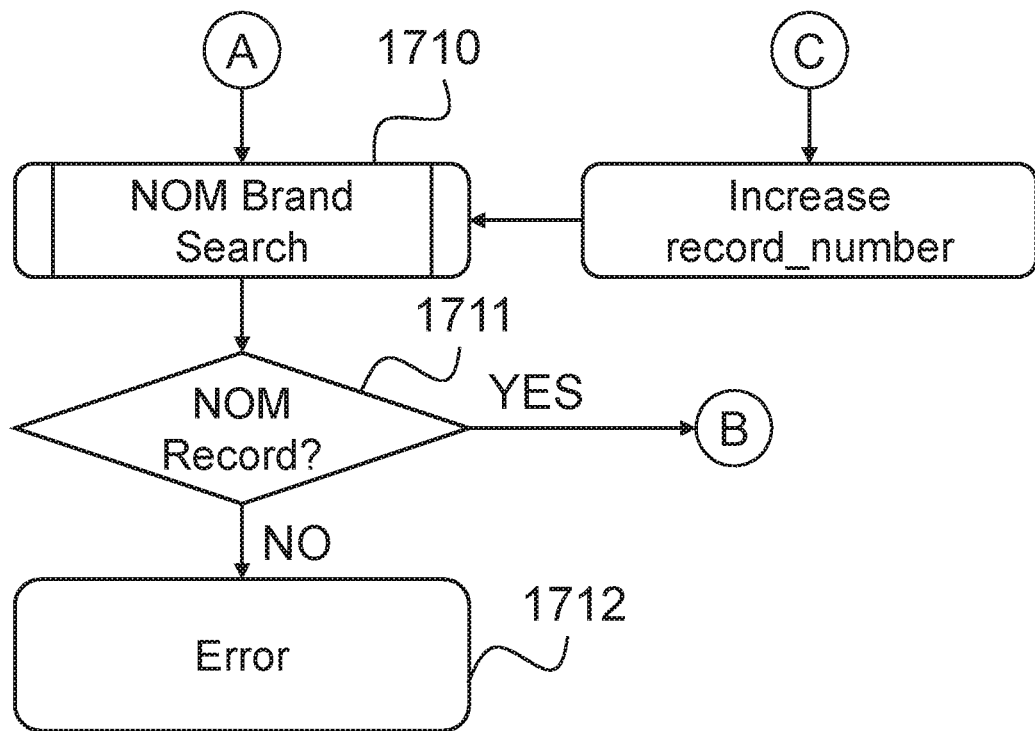
Figure 18A:
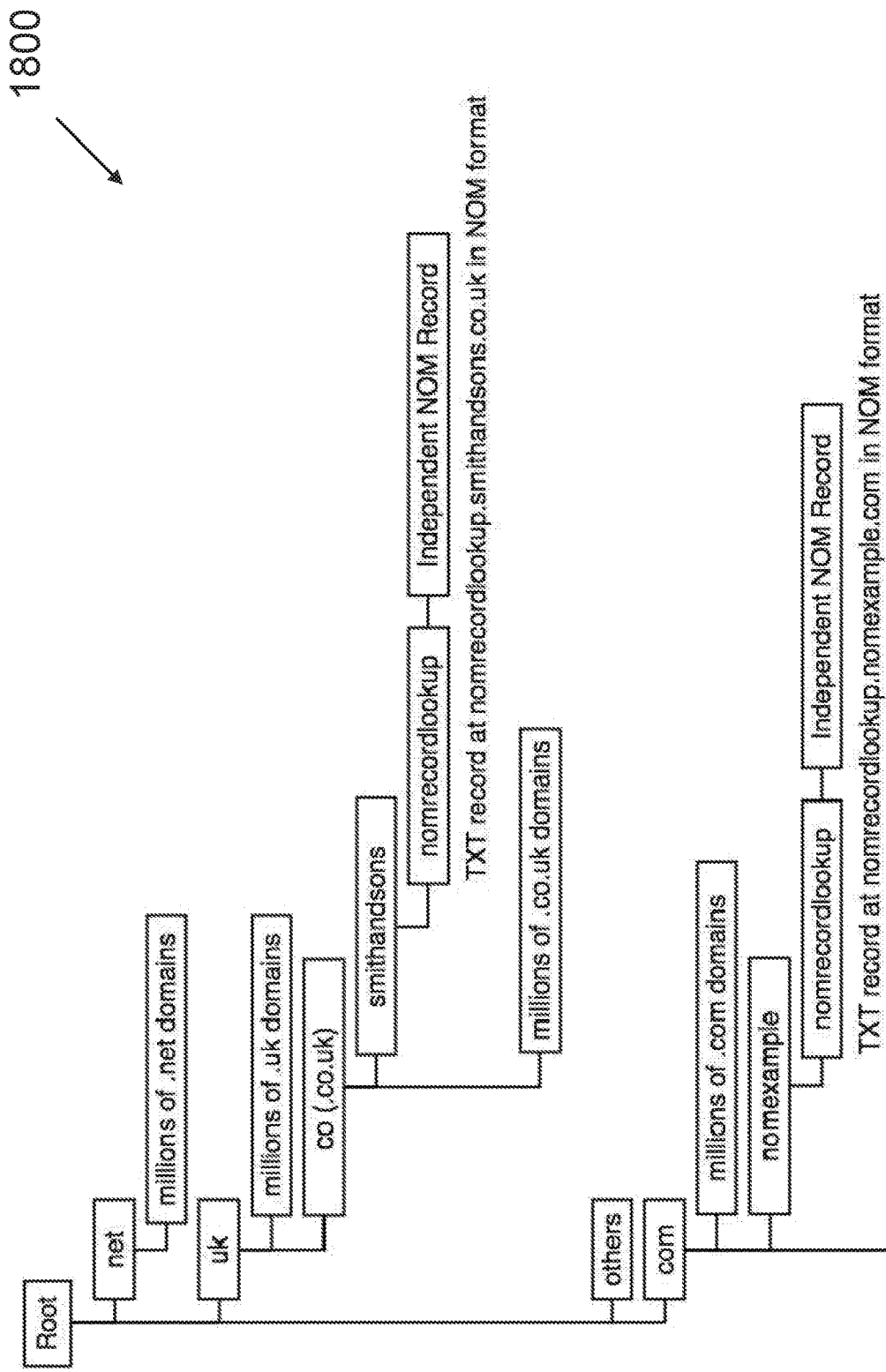
FIGS. 18A, 18B, 18C and 18D show a schematic block diagram of an example of a hierarchical domain name system in accordance with an embodiment of the present invention.
Figure 18B:
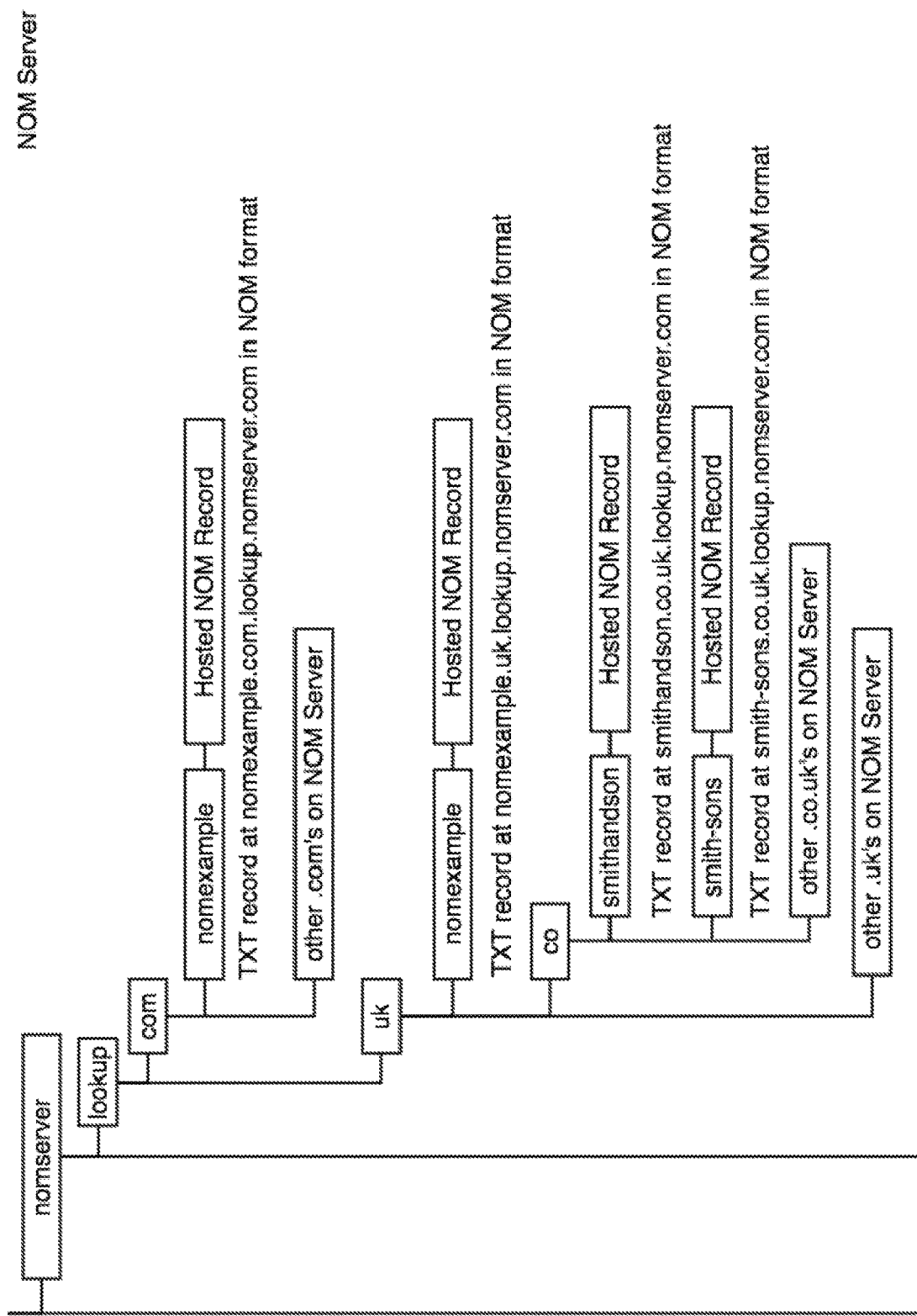
Figure 18C:
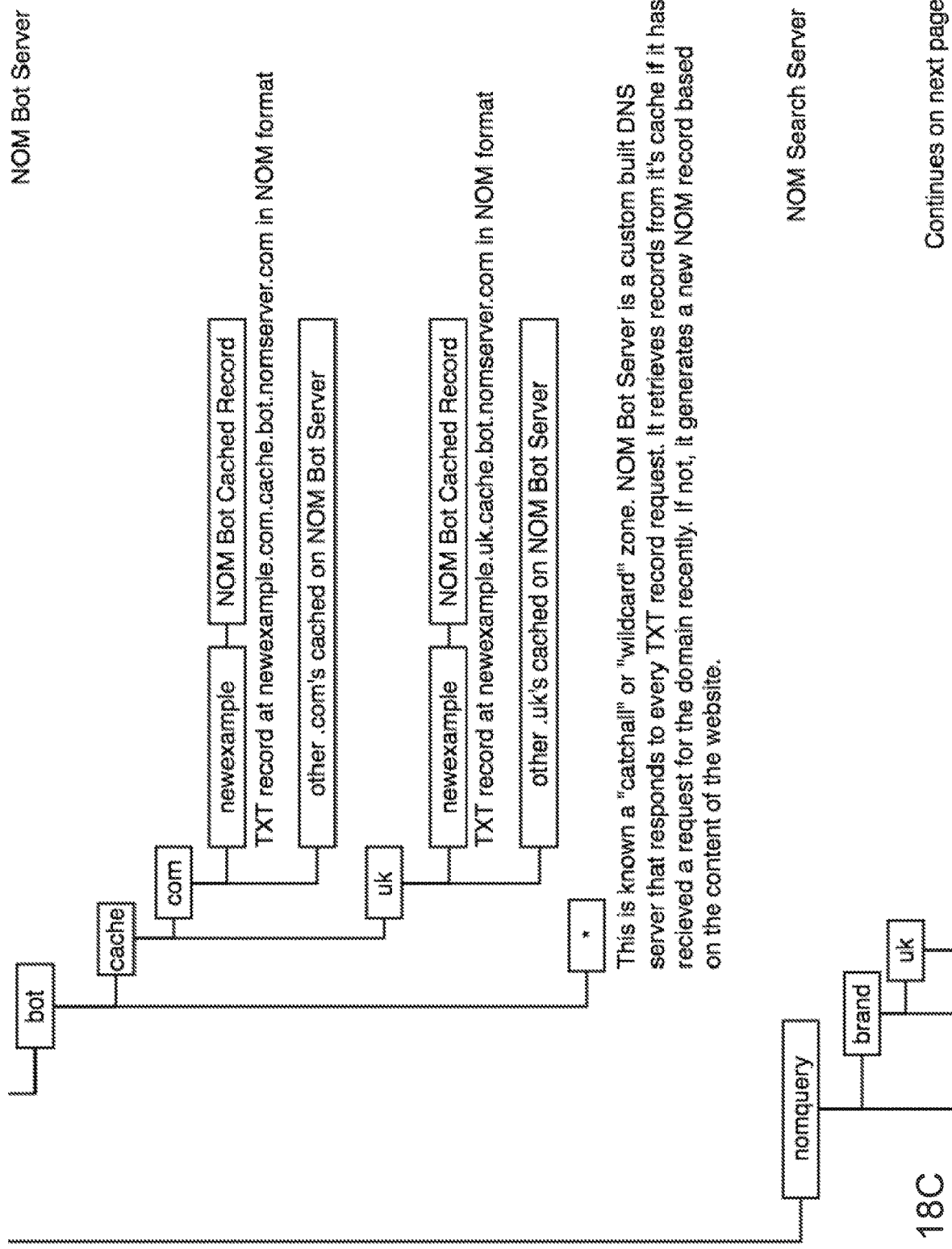
Figure 18D:
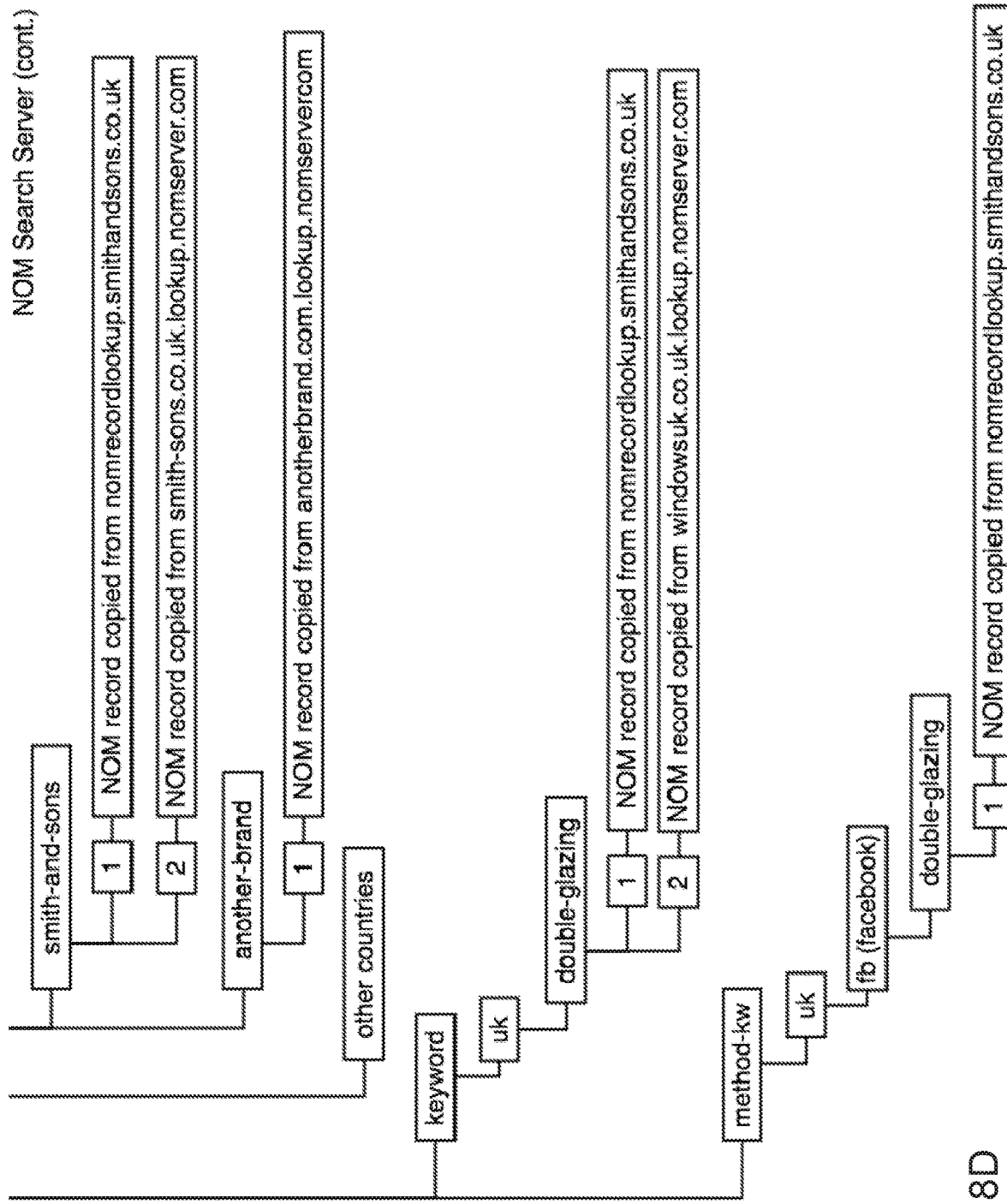

Referring to FIGS. 17A and 17B, there is shown a flowchart of a method of processing data. In this example, the method is associated with searching performed by the NOM Interrogator based on a domain or other input data. The search facility works alongside the process of a user searching for contact information by entering a domain name. In the example below the 'Brand Search' has been shown.

At 1700, user input is received. The user input may for example comprise a domain name and/or one or more data strings.

At 1701, it is determined whether the data input by the user includes a predetermined character. In this example, the predetermined character is a dot (or "period") ".".

If it is determined at 1701 that the data input includes a dot, then it is determined that the user input is a domain name. At 1702, an Independent NOM Domain Name Lookup is performed for the domain name input by the user.

At 1703, it is determined whether the Independent NOM Domain Name Lookup performed at 1703 resulted in a NOM Record being returned.

If the result of the determination at 1703 is that a NOM Record is returned, then the NOM Record is displayed at 1704.

If the result of the determination at 1703 is that a NOM Record is not returned, then a Hosted NOM Domain Name Lookup is performed at 1705.

At 1706, it is determined whether the Hosted NOM Domain Name Lookup performed at 1705 resulted in a NOM Record being returned.

If the result of the determination at 1706 is that a NOM Record is returned, then the NOM Record is displayed at 1704.

If the result of the determination at 1706 is that a NOM Record is not returned, then a NOM Bot Lookup is performed at 1707.

At 1708, it is determined whether the NOM Bot Lookup performed at 1707 resulted in a NOM Record being returned.

If the result of the determination at 1708 is that a NOM Record is returned, then the NOM Record is displayed at 1704.

If the result of the determination at 1708 is that a NOM Record is not returned, then a predetermined action is taken at 1709. In this example, the predetermined action involves an error message being returned and displayed. For example the message "No NOM Record found for this domain name" may be displayed.

If it is determined at 1701 that the data input does not include a dot, then it is determined that the user input is a not a domain name.

The value of the "record_number" variable is set to "1". At 1710, a NOM Brand Search Within Framework procedure is performed based on a current value of the "record_number" variable.

At 1711, it is determined whether the NOM Brand Search Within Framework procedure performed at 1710 resulted in a NOM Record being returned.

If it is determined at 1711 that the NOM Brand Search Within Framework procedure performed at 1710 resulted in a NOM Record being returned, then the NOM Record is displayed at 1704.

If it is determined at 1711 that the NOM Brand Search Within Framework procedure performed at 1710 did not result in a NOM Record being returned, then a predetermined action takes place at 1712. In this example, the predetermined actions comprises returning an error message.

If a user wishes to navigate through multiple NOM Records via a Records Navigator function in the Interrogator, for example by selecting "next" and "previous", then the value of the "record_number" variable is increased by "1" or decreased by "1" respectively.

Referring to FIGS. 18A to 18D, there is shown an example of a hierarchical domain name system 1800. FIGS. 18A to 18D illustrate how NOM fits into the DNS. The NOM Framework has been designed to fit into the DNS system and benefit from caching and the distributed nature of DNS. FIGS. 18A to 18D show how Independent NOM Records, Hosted NOM Records, the NOM Bot and NOM searches fit into the DNS.

Figure 19:
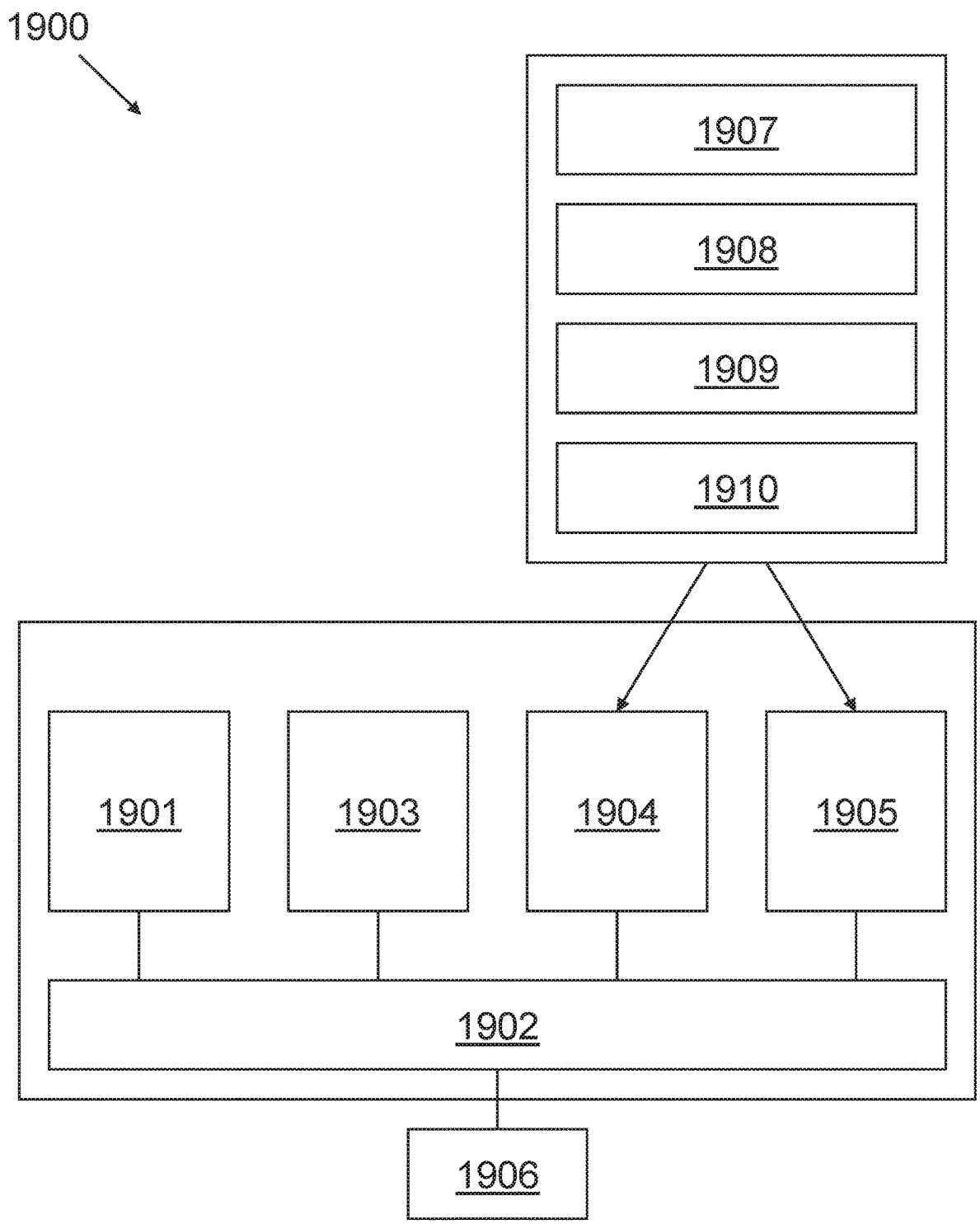
FIG. 19 shows a schematic block diagram of an example of an apparatus in accordance with an embodiment of the present invention.

Referring to FIG. 19, there is shown a block diagram of an apparatus 1900. The apparatus is configured to process data. The apparatus 1900 may, for example, comprise one or more of the apparatuses 301, 302, 303, 304 described above with reference to FIG. 3.

The apparatus 1900 may take various different forms. Examples of forms of the apparatus 1900 include, but are not limited to, mobile telephony device, a satellite navigation system, a smart television set, a desktop computer, a laptop computer, a server, a name server, a tablet computing device, a router etc.

In this example, the apparatus 1900 comprises one or more processors 1901 configured to process information and/or instructions. The one or more processors 1901 may comprise a central processing unit (CPU). The one or more processors 1901 are coupled with a bus 1902. Operations performed by the one or more processors 1901 may be carried out by hardware and/or software.

In this example, the apparatus 1900 comprises computer-useable volatile memory 1903 configured to store information and/or instructions for the one or more processors 1901. The computer-useable volatile memory 1903 is coupled with the bus 1902. The computer-useable volatile memory 1903 may comprise random access memory (RAM).

In this example, the apparatus 1900 comprises computer-useable non-volatile memory 1904 configured to store information and/or instructions for the one or more processors 1901. The computer-useable non-volatile memory 1904 is coupled with the bus 1902. The computer-useable non-volatile memory 1904 may comprise read-only memory (ROM).

In this example, the apparatus 1900 comprises one or more data-storage units 1905 configured to store information and/or instructions. The one or more data-storage units 1905 are coupled with the bus 1902. The one or more data-storage units 1905 may for example comprise a magnetic or optical disk and disk drive.

In this example, the apparatus 1900 comprises one or more input/output (I/O) devices 1906 configured to communicate information to the one or more processors 1901. The one or more I/O devices 1906 are coupled with the bus 1902. The one or more I/O devices 1906 may comprise at least one network interface. The at least one network interface may enable the apparatus 1900 to communicate via one or more data communications networks. Examples of data communications networks include, but are not limited to, the Internet, a Local Area Network (LAN) and a wide area network (WAN). The one or more I/O devices 1906 may enable a user to provide input to the apparatus 1900 via one or more input devices (not shown). Examples of input devices include, but are not limited to, a keyboard and a mouse. The one or more I/O devices 1906 may enable information to be provided to a user via one or more output devices (not shown). Examples of output devices include, but are not limited to, a computer monitor and a display screen.

Various other entities are depicted for the apparatus 1900. For example, when present, an operating system 1907, a data processing system 1908, one or more modules 109, and data 1910 are shown as residing in one, or a combination, of the computer-usable volatile memory 1903, computer-usable non-volatile memory 1904 and the one or more data-storage units 1905. The data processing system 1908 may be implemented by way of computer program code stored in memory locations within the computer-usable non-volatile memory 1904, computer-readable storage media within the one or more data-storage units 1905 and/or other tangible computer-readable storage media.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 1900 may comprise more, fewer and/or different components from those depicted in FIG. 19.

Various features of the NOM Framework described above will now be described.

The NOM Framework may allow reduced load on networks and/or reduced bandwidth costs. A first known technique for obtaining contact information for a business involves typing the company domain name into the address bar of a web browser on an internet-enabled device, which it is estimated requires around 2.2 Mb of data to be downloaded on average per webpage. A second known technique involves typing the company name into a search engine and clicking on the relevant listing to be taken to the company domain name, which it is estimated requires around 2.2 Mb of data to be downloaded. A third known technique involves typing the company name into a search engine and finding the relevant information on the results page, which it is estimated requires around 50 kb of data to be downloaded.

It is estimated that the amount of data needed to download an average web page based on currently available data is over 2.2 Mb. It is estimates that data size per web page is increasing by a rate of around 15% per year. The data size of a search engine results page varies depending on the device and application used and the search query. Search engine applications for smart phone users and file caching reduces the data required in some cases but the data requirement is still substantial when compared to the amount of data required under the NOM Framework. Even using a conservative estimate of 50 kb required to perform a search using the third known technique described above, performing a search using the NOM framework may involve only 512 bytes (0.512 kb) of data in some examples. This is less than 0.025% of the data estimated to be needed for the first and second known techniques described above and less than 1% of the data estimated to be needed for the third known techniques described above. With the first, second and third known techniques, often the piece of contact information required may not be found on the first page and may require two or three more clicks to find the information the user is looking for.

The NOM Framework is designed for returning contact information rather than for returning more detailed information, which can be retrieved via a search engine. When a user is looking for a contact telephone number, all they need is 11 digits but known techniques force the user to download many thousands of bytes of data that make up the HTML, JavaScript and CSS included in websites.

The NOM Framework may reduce the amount of people using search engines and company websites for contact information by a significant number. If all of these people were using the NOM Framework to find contact information, this would result in a noticeable reduction in traffic on the Internet. This is especially important when using mobile internet.

The cost savings of using the NOM Framework could also be substantial, especially for mobile internet users. In developing nations where mobile internet is the only way to connect, data charges can be very restrictive.

Despite using the DNS to run the NOM Framework, the NOM Framework may significantly reduce the load on the DNS. This is because of the way websites work and a growing trend of outsourcing the hosting of website assets. When a webpage is requested, it is sometimes rendered using many asset files. These assets might be images and style sheets for presentation or JavaScript to display syndicated advertising or advanced features. Many of these assets are provided by external services known as Content Delivery Networks (CDNs). For example, when visiting an example website domain1.com, a request is made is for domain1.com, which requires a first DNS query, images may be loaded from images.domain1.com, which requires a second DNS query, CSS may be loaded from css.domain1.com, which requires a third DNS query, jQuery may be loaded from a CDN code.jquery.com, which requires a fourth DNS query, and advertisements may be load from adsense.google.com, which requires a fifth DNS query. Although one website has been requested, the browser has made five separate DNS queries. In contrast, fewer than five DNS queries may be required to return contact information under the NOM Framework.

Voice over IP (VoIP) is well established but businesses rarely advertise a VoIP number despite many businesses having VoIP connectivity. Although the telephone infrastructure is slowly moving over to VoIP, there is normally a traditional telephone exchange involved to initiate the call. Businesses typically do not want to confuse potential customers by advertising two different contact numbers. The NOM Framework would enable a user to call a company using the domain name of the company. The NOM Framework could route calls over VoIP when available, reducing costs for the caller.

The NOM Framework enables people to use a domain name (e.g. "example.com") to connect to the associated business in many different ways. For example, a user may be able to dial the domain name "example.com" from a smartphone. A user may be able to type the domain name "example.com" into a GPS system (for example a satellite navigation system or smartphone) for a precise location for customer parking or a customer entrance, instead of an often inaccurate store postcode. A user may be able to connect via social media through the domain name "example.com". A user may be able to view a list of ways to connect by simply entering the domain name "example.com" into a NOM Interrogator application.

As described in some examples above, the NOM Server provides domain hosting. In some examples, the NOM Server stores and serves out Hosted NOM Records. The NOM Server may be used by users that may not have the expertise or time to setup their own Independent NOM Record on their own DNS servers. In some examples, the DNS stores contact information within a DNS TXT record for a domain name (e.g. example.com) within the DNS zone of another domain name (e.g. lookup.nomserver.com), creating a new zone containing contact information for the domain (e.g. example.com.lookup.nomserver.com).

The NOM Server can be searched for brands or keywords. These are known as "search terms". Domain names can be listed under search terms within the DNS system of the NOM Server. This allows the NOM Server to be queried for a brand or keyword instead of just a domain name. For example, instead of searching for 'example.com' users could search for 'example' or 'double glazing'. Spaces in search queries are automatically replaced with hyphens. The NOM lookups for a UK user would be in the format of: "example.brand.uk.nomquery.com" and "double-glazing.keyword.uk.nomquery.com".

The domain names returned for a search will be the "country specific domain" (e.g. example.co.uk and doubleglazing.co.uk for a UK user) and the "international domain" (e.g. example.com and doubleglazing.com). Domain names may also be listed for companies that hold a registered trademark for the exact term in the country of the user. In some examples, evidence of trademark registrations will need to be submitted by domain owners. Businesses may be allowed to pay to be listed under keywords. Results for these searches are retrieved from the DNS in the following format: "<<record_number>>.<<brand>>.brand.<<user_country>>.nomquery.com". For example, the first record number would be "1.example.brand.uk.nomquery.com" and the second record would be "2.example.brand.uk.nomquery.com"

The NOM Server can be searched for a keyword and a method using the DNS system. This allows the NOM Server to be queried for businesses that can be contacted about a certain subject (e.g. "builder") via a certain method (e.g. Facebook). Results for these searches are retrieved from the DNS in the following format:

<<record_number>>.<<keyword>>.<<method>>.method-kw.<<user_country>>.nomquery.com. An example of the first record would be "1.builder.fb.method-kw.uk.nomquery.com" and an example of the second record would be "2.builder.fb.method-kw.uk.nomquery.com".

As described in some examples above, the NOM Bot is the software that automatically creates a NOM Record for domain names that have neither an independent NOM Record on their own DNS server nor a Hosted NOM Record on the NOM server. In some examples, contact information within the HTML content of a website hosted on a given domain name is automatically gathered and is stored in a DNS TXT record for the domain name.

Various measures (for example a method, apparatus, and computer program) of processing data in a data communications network comprising a hierarchical domain name system are provided. An authoritative name server for a first domain name receives, via the data communications network, a domain name system query for the first domain name. The authoritative name server for the first domain name processes the received domain name system query for the first domain name. The processing comprises obtaining one or more resource records associated with the first domain name. The one or more resource records comprises contact information associated with an entity associated with a second, different domain name. The authoritative name server for the first domain name transmits, via the data communications network, a response to the domain name system query for the first domain name. The response comprises the one or more resource records comprising the contact information associated with the entity associated with the second domain name. The first domain name includes the second domain name. The first domain name includes at least one label following the second domain name.

The second domain name may be a resolvable domain name. The at least one label following the second domain name may form part of a resolvable third domain name.

The first domain name may include at least two labels following the second domain name. The at least two labels may comprise a label corresponding to a top-level domain name. The at least two labels may comprise a second-level domain name. The second domain name may include at least two labels. The second domain name may include at least three labels. The second domain name may include at least four labels. The second domain name may include at least five labels. The one or more resource records may be in a zone file describing the first domain name. The one or more resource records may be stored in the zone file describing the first domain name. The obtaining of the one or more resource records associated with the first domain name may comprise retrieving the one or more resource records associated with the first domain name from the zone file describing the first domain name. The one or more resource records may comprise a plurality of resource records. The domain name system query may comprise a request for a TXT type of resource record only. The one or more resource records may be of a TXT type. The response to the domain name system query may comprise only the one or more resource records. The entity may be a registrant of the second domain name. The hierarchical domain name system may be the Domain Name System, DNS. The contact information may comprise a plurality of contact identifiers associated with the entity associated with the second domain name. A further name server may be an authoritative name server for the second domain name, the further name server being different from the authoritative name server for the first domain name. The authoritative name server for the first domain name may also the authoritative name server for the second domain name. At least part of an automated authentication process may be performed at a server to allow some or all of the contact information in the one or more resource records to be modified. The first domain name may include no labels prior to the second domain name.

Various measures (for example a method, apparatus, and computer program) of processing data in a data communications network comprising a hierarchical domain name system are provided. A domain name system query for a first domain name is transmitted via the data communications network. A response to the domain name system query for the first domain name is received via the data communications network. The response comprises one or more resource records comprising contact information associated with an entity associated with a second, different domain name. The response to the domain name system query for the first domain name is processed. Processing comprises identifying the contact information associated with the entity associated with the second domain name in the one or more resource records. The first domain name includes the second domain name. The first domain name includes at least one label following the second domain name.

The second domain name may be a resolvable domain name. The at least one label following the second domain name may form part of a resolvable domain name. The first domain name may include at least two labels following the second domain name. The at least two labels may comprise a label corresponding to a top-level domain name. The at least two labels may comprise a second-level domain name. The second domain name may include at least two labels. The second domain name may include at least three labels. The second domain name may include at least four labels. The second domain name may include at least five labels. The one or more resource records may comprise a plurality of resource records. The domain name system query may comprise a request for a TXT type of resource record only. The one or more resource records may be of a TXT type. The response to the domain name system query may comprise only the one or more resource records. The entity may be a registrant of the second domain name. The hierarchical domain name system may be the Domain Name System, DNS. The contact information may comprise a plurality of contact identifiers associated with the entity associated with the second domain name. A further name server may be an authoritative name server for the second domain name, the further name server being different from the authoritative name server for the first domain name. The authoritative name server for the first domain name may also be the authoritative name server for the second domain. The first domain name may include no labels prior to the second domain name. A domain name system query for a third domain name may be transmitted via the data communications network. A response to the domain name system query for the third domain name may be received via the data communications network indicating that contact information associated with the entity associated with the second domain name is not available. The third domain name may include the second domain name. The third domain name may include at least one label preceding the second domain name. The transmitting of the domain name system query for the first third domain name may be in response to the receiving of the response to the domain name system query for the third domain name indicating that contact information associated with the entity associated with the second domain name is not available. The method may be performed by a user device.

A hierarchical domain name system zone file is provided. The hierarchical domain name system zone file comprises data identifying a first domain name and contact information associated with an entity associated with a second, different domain name. The first domain name may include the second domain name. The first domain name may include at least one label following the second domain name.

The second domain name may be a resolvable domain name. The at least one label following the second domain name may form part of a resolvable domain name. The first domain name may include at least two labels following the second domain name. The at least two labels may comprise a label corresponding to a top-level domain name. The at least two labels may comprise a second-level domain name. The second domain name may include at least two labels. The second domain name may include at least three labels. The second domain name may include at least four labels. The second domain name may include at least five labels. The one or more resource records may comprise a plurality of resource records. The one or more resource records may be of a TXT type. The entity may be a registrant of the second domain name. The hierarchical domain name system may be the Domain Name System, DNS. The contact information may comprise a plurality of contact identifiers associated with the entity associated with the second domain name. A further name server may be an authoritative name server for the second domain name, the further name server being different from the authoritative name server for the first domain name. The authoritative name server for the first domain name may also be the authoritative name server for the second domain. The authoritative name server for the first domain name may also be the authoritative name server for the second domain. The first domain name may include no labels prior to the second domain name.

Various measures (for example a method, apparatus and computer program) of processing data in a data communications network comprising a hierarchical domain name system are provided. An authoritative name server for a first domain name receives, via the data communications network, a domain name system query for the first domain name. The authoritative name server for the first domain name processes the received domain name system query for the first domain name. The processing comprises obtaining one or more resource records associated with the first domain name. The one or more resource records comprise contact information associated with an entity associated with a second, different domain name. The authoritative name server for the first domain name transmits, via the data communications network, a response to the domain name system query for the first domain name. The response comprises the one or more resource records comprising the contact information associated with the entity associated with the second domain name. The first domain name includes the second domain name. The first domain name includes at least one label preceding the second domain name. The contact information is in plaintext form in the one or more resource records and/or one or more resource records are of a TXT type.

The one or more resource records may be in a zone file describing the first domain name. The one or more resource records may be stored in the zone file describing the first domain name. The obtaining of the one or more resource records associated with the first domain name may comprise retrieving the one or more resource records associated with the first domain name from the zone file describing the first domain name. The one or more resource records may comprise a plurality of resource records. The domain name system query may comprise a request for a TXT type of resource record only. The response to the domain name system query may comprise only the one or more resource records. The entity may be a registrant of the second domain name. The hierarchical domain name system may be the Domain Name System, DNS. The contact information may comprise a plurality of contact identifiers associated with the entity associated with the second domain name. A further name server may be an authoritative name server for the second domain name. The further name server may be different from the authoritative name server for the first domain name. The authoritative name server for the first domain name may also be the authoritative name server for the second domain.

Various measures (a method, apparatus and computer program) of processing data in a data communications network comprising a hierarchical domain name system are provided. A domain name system query for a first domain name is transmitted via the data communications network. A response to the domain name system query for the first domain name is received via the data communications network. The response comprises one or more resource records comprising contact information associated with an entity associated with a second, different domain name. The response to the domain name system query for the first domain name is processed. The processing comprises identifying the contact information associated with the entity associated with the second domain name in the one or more resource records. The first domain name includes the second domain name. The first domain name includes at least one label preceding the second domain name. The contact information is in plaintext form in the one or more resource records and/or one or more resource records are of a TXT type.

The one or more resource records may be in a zone file describing the first domain name. The one or more resource records may comprise a plurality of resource records. The domain name system query may comprise a request for a TXT type of resource record only. The response to the domain name system query may comprise only the one or more resource records. The entity may be a registrant of the second domain name. The hierarchical domain name system may be the Domain Name System, DNS. The contact information may comprise a plurality of contact identifiers associated with the entity associated with the second domain name. A further name server may be an authoritative name server for the second domain name, the further name server being different from the authoritative name server for the first domain name. The authoritative name server for the first domain name may also be the authoritative name server for the second domain. The method may be performed by a user device.

A hierarchical domain name system zone file comprising data identifying a first domain name and contact information associated with an entity associated with a second, different domain name is provided. The first domain name includes the second domain name. The first domain name includes at least one label preceding the second domain name. The contact information is in plaintext form.

A hierarchical domain name system zone file comprising data identifying a first domain name and contact information associated with an entity associated with a second, different domain name is provided. The first domain name includes the second domain name. The first domain name includes at least one label preceding the second domain name. The contact information is in a resource record of a TXT type.

Various measures (a method, apparatus and computer program) of processing data in a data communications network comprising a hierarchical domain name system are provided. A request for website content from a website associated with a domain name is transmitted via the data communications network. The website content is received via the data communications network. The received website content is parsed for contact information associated with an entity associated with the domain name using at least one automated contact information parsing technique. The contact information is caused to be stored in a zone file.

The hierarchical domain name system may be the Domain Name System, DNS. The causing may comprise causing the contact information to be stored in one or more resource records of a TXT type in the zone file. The zone file may define a further domain name, the further domain being different from the domain name. The parsing may comprise inspecting the website content for links to further website content potentially comprising the contact information. In response to identifying one or more links to further website content potentially comprising the contact information, a request for the further website content may be transmitted via the data communications network. The further website content may be inspected for the contact information. The request for the website content may comprise the domain name. The request for the website content may comprise a HTTP GET request. The website content may comprise HTML content. The at least one automated contact information parsing technique may comprise at least one pattern matching technique. The at least one automated contact information parsing technique may comprise at least one regular expression matching technique. The method may be performed at a user device. The method may be performed at server apparatus. Transmitting the request for website content may be in response to receiving a request from a user device, the request comprising the domain name. The request from the user device may comprise a HTTP GET request. The request from the user device may comprise a domain name system request A hierarchical domain name system zone file comprising contact information associated with an entity associated with a domain name is provided. The zone file comprises data indicative that the contact information has been obtained using an automated contact information parsing technique. The data indicative that the contact information has been obtained using an automated contact information parsing technique may comprise a label in the domain name.

A hierarchical domain name system zone file is provided. The zone file comprises contact information associated with an entity associated with a domain name. The contact information associated with an entity associated with a domain name is comprised in one or more resource records of a TXT type.

The above embodiments are to be understood as illustrative examples. Further embodiments of the invention are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing data in a data communications network comprising a hierarchical domain name system, the method comprising, at an authoritative name server for a first domain name:
   receiving, via the data communications network, a domain name system query for the first domain name;
   processing the received domain name system query for the first domain name, said processing comprising obtaining one or more resource records associated with the first domain name, the one or more resource records comprising information associated with an entity associated with a second, different domain name; and
   transmitting, via the data communications network, a response to the domain name system query for the first domain name, the response comprising the one or more resource records comprising the information associated with the entity associated with the second domain name,
   wherein the first domain name includes the second domain name,
   wherein the first domain name includes at least one label following the second domain name, and
   wherein a further name server is an authoritative name server for the second domain name, the further name server being different from the authoritative name server for the first domain name.

2. A method according to claim 1, wherein the second domain name is a resolvable domain name.

3. A method according to claim 1, wherein the at least one label following the second domain name forms part of a resolvable third domain name.

4. A method according to claim 1, wherein the first domain name includes at least two labels following the second domain name.

5. A method according to claim 4, wherein the at least two labels comprise a label corresponding to a top-level domain name.

6. A method according to claim 4, wherein the at least two labels comprise a second-level domain name.

7. A method according to claim 1, wherein the second domain name includes at least two labels.

8. A method according to claim 1, wherein the domain name system query comprises a request for a TXT type of resource record only.

9. A method according to claim 1, wherein the one or more resource records are of a TXT type.

10. A method according to claim 1, wherein the information comprises contact information associated with the entity associated with the second domain name.

11. A method of processing data in a data communications network comprising a hierarchical domain name system, the method comprising:
   transmitting, via the data communications network, a domain name system query for a first domain name;
   receiving, via the data communications network, a response to the domain name system query for the first domain name, the response comprising one or more resource records comprising information associated with an entity associated with a second, different domain name; and
   processing the response to the domain name system query for the first domain name, said processing comprising identifying the information associated with the entity associated with the second domain name in the one or more resource records,
   wherein the first domain name includes the second domain name,
   wherein the first domain name includes at least one label following the second domain name, and
   wherein a further name server is an authoritative name server for the second domain name, the further name server being different from the authoritative name server for the first domain name.

12. A method according to claim 11, comprising:
   transmitting, via the data communications network, a domain name system query for a third domain name;
   receiving, via the data communications network, a response to the domain name system query for the third domain name indicating that information associated with the entity associated with the second domain name is not available,
   wherein the third domain name includes the second domain name, and
   wherein the third domain name includes at least one label preceding the second domain name.

13. A method according to claim 12, wherein said transmitting of said domain name system query for the first domain name is in response to said receiving of said response to the domain name system query for the third domain name indicating that information associated with the entity associated with the second domain name is not available.

14. A method of processing data in a data communications network comprising a hierarchical domain name system, the method comprising, at an authoritative name server for a first domain name:
    receiving, via the data communications network, a domain name system query for the first domain name;
    processing the received domain name system query for the first domain name, said processing comprising obtaining one or more resource records associated with the first domain name, the one or more resource records comprising contact information associated with an entity associated with a second, different domain name; and
    transmitting, via the data communications network, a response to the domain name system query for the first domain name, the response comprising the one or more resource records comprising the contact information associated with the entity associated with the second domain name,
    wherein the first domain name includes the second domain name,
    wherein the first domain name includes at least one label preceding the second domain name,
    wherein a further name server is an authoritative name server for the second domain name, the further name server being different from the authoritative name server for the first domain name, and
    wherein the contact information is in plaintext form in the one or more resource records and/or one or more resource records are of a TXT type.

15. A method according to claim 14, wherein the one or more resource records are in a zone file describing the first domain name.

16. A method according to claim 14, wherein the entity is a registrant of the second domain name.

17. A method according to claim 14, wherein the authoritative name server for the first domain name is also the authoritative name server for the second domain name.

18. A method of processing data in a data communications network comprising a hierarchical domain name system, the method comprising:
    transmitting, via the data communications network, a domain name system query for a first domain name;
    receiving, via the data communications network, a response to the domain name system query for the first domain name, the response comprising one or more resource records comprising contact information associated with an entity associated with a second, different domain name; and
    processing the response to the domain name system query for the first domain name, said processing comprising identifying the contact information associated with the entity associated with the second domain name in the one or more resource records,
    wherein the first domain name includes the second domain name,
    wherein the first domain name includes at least one label preceding the second domain name,
    wherein a further name server is an authoritative name server for the second domain name, the further name server being different from the authoritative name server for the first domain name, and
    wherein the contact information is in plaintext form in the one or more resource records and/or one or more resource records are of a TXT type.

* * * * *